(12) United States Patent
Wells et al.

(10) Patent No.: US 10,414,040 B2
(45) Date of Patent: Sep. 17, 2019

(54) ROBOTIC DOLLY TRANSFER SYSTEMS HAVING FLOATING COUPLINGS

(71) Applicant: Toyota Motor Engineering & Manufacturing North America, Inc., Erlanger, KY (US)

(72) Inventors: Keith J. Wells, Evansville, IN (US); Shigeo Akiyama, Union, KY (US); Alinine R. Ngosi, Lexington, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 31 days.

(21) Appl. No.: 15/874,571

(22) Filed: Jan. 18, 2018

(65) Prior Publication Data
US 2019/0217463 A1    Jul. 18, 2019

(51) Int. Cl.
| | | |
|---|---|---|
| *B25J 5/02* | (2006.01) | |
| *B25J 9/00* | (2006.01) | |
| *B25J 15/00* | (2006.01) | |

(52) U.S. Cl.
CPC ............... *B25J 5/02* (2013.01); *B25J 9/0048* (2013.01); *B25J 15/0028* (2013.01); *Y10S 901/15* (2013.01); *Y10S 901/31* (2013.01)

(58) Field of Classification Search
CPC ............... B25J 15/0093; B25J 15/0095; B25J 15/0028; B25J 5/02; B25J 9/0048; B25J 9/0093; B25J 9/02; Y10S 901/15; Y10S 901/31

USPC ........ 414/226.05, 277, 542, 591, 669, 744.1
See application file for complete search history.

(56) References Cited

U.S. PATENT DOCUMENTS

| | | |
|---|---|---|
| 6,236,008 B1 | 5/2001 | Bonnet |
| 6,318,951 B1 | 11/2001 | Schmidt et al. |
| 8,342,047 B1 | 1/2013 | Lusch |
| 9,014,844 B2 | 4/2015 | Casey et al. |
| 2004/0240981 A1 | 12/2004 | Dothan et al. |

FOREIGN PATENT DOCUMENTS

CN         102556216 B     8/2013

*Primary Examiner* — Ronald P Jarrett
(74) *Attorney, Agent, or Firm* — Dinsmore & Shohl LLP

(57) ABSTRACT

A robotic dolly transfer system configured to transport dollies includes a full dolly transfer system and an empty dolly transfer system. The full dolly transfer system and the empty dolly transfer system individually include a rail assembly and a carriage. The carriage is slidably attached to the rail assembly and includes a bottom surface that has a post extending outwardly. The rail assembly includes a rail actuator assembly having an actuator and a receiver attached to the actuator. The receiver includes an opening that receives the post such that the post floats within the opening to permit the carriage to move a predetermined amount independent from the receiver. The actuator is configured to displace the receiver such that receiver contacts the post to slide the carriage with respect to the rail assembly. A end effector is pivotally connected to a transfer arm assembly and is configured to engage the dolly.

20 Claims, 15 Drawing Sheets

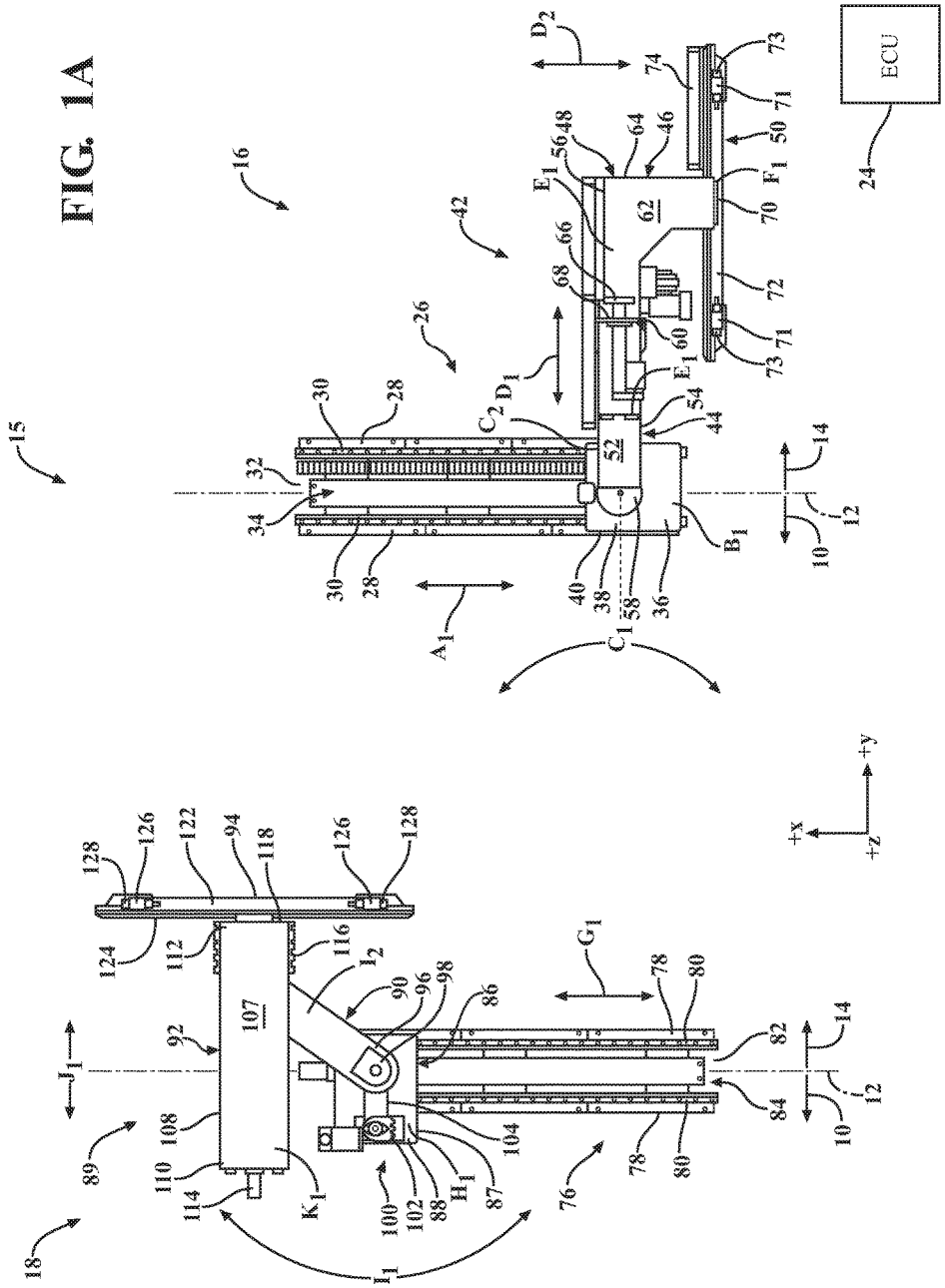

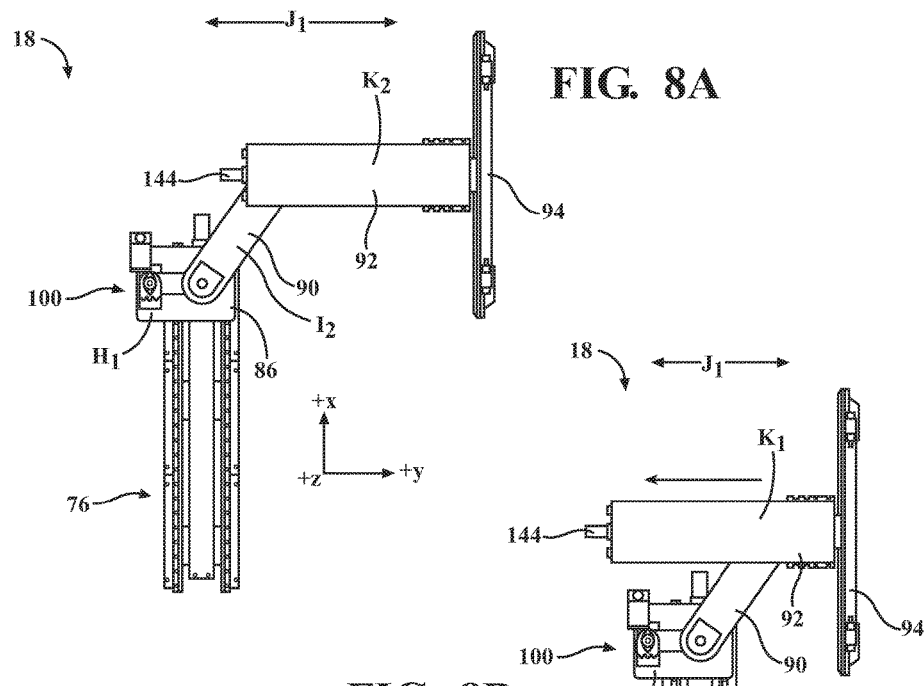
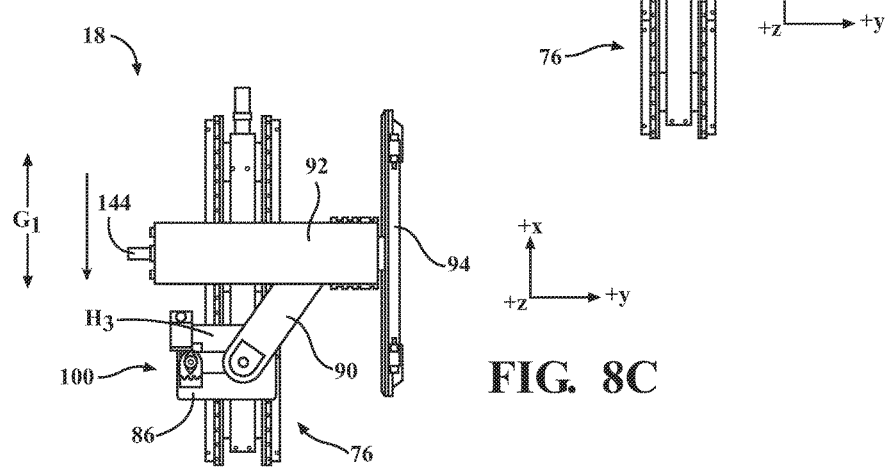
FIG. 8A
FIG. 8B
FIG. 8C

ROBOTIC DOLLY TRANSFER SYSTEMS HAVING FLOATING COUPLINGS

TECHNICAL FIELD

The present specification generally relates to robotic dolly transfer systems and, more specifically, to robotic dolly transfer systems that include a pivoting end effector and floating coupling features that prevent mechanical damage and loss of cycle time that may occur due to a misload.

BACKGROUND

Automotive manufacturers, in a vehicle assembly process, generally use snake robots to transfer dollies with a relatively high accuracy. The dollies may generally hold a rear end chassis. Snake robots generally have an arm with multiple servomotor driven joints that allow the joints to rotate the arm in all various. However, due to of the flexibility in the joints, the snake robot is unable to precisely stop and carry large load dollies. Moreover, the rotation of the joints precludes optimizing the load capacity and slows the production cycle of the snake robot. Further, variation in the dollies and/or a misload of the dollies may cause significant mechanical damage and/or loss of cycle time.

Accordingly, there is a need for a robotic transfer systems that can precisely stop and carry large loads dollies while accommodating for a variation in the dollies while preventing mechanical damage that may occur during a misload.

SUMMARY

A full dolly transfer system for transporting a dolly includes a rail assembly and a carriage. The carriage is slidably attached to the rail assembly. The carriage includes an upper surface, an opposite bottom surface, and a post that extends outwardly from the bottom surface of the carriage. The rail assembly includes a rail actuator assembly. The rail actuator assembly includes an actuator and a receiver attached to the actuator. The receiver includes an opening that receives the post of the carriage such that the post floats within the opening to permit the carriage to move a predetermined amount independent from the receiver. The actuator is configured to displace the receiver such that receiver contacts the post to slide the carriage with respect to the rail assembly. A dolly transfer arm assembly is connected to the carriage. The dolly transfer arm assembly includes a dolly end effector. The dolly end effector is configured to engage the dolly and transfer the dolly upon actuation of the actuator.

In another embodiment, an empty dolly transfer system for transporting a dolly includes a rail assembly and a carriage. The carriage is slidably attached to the rail assembly. The carriage includes an upper surface, an opposite bottom surface, and a post that extends outwardly from the bottom surface of the carriage. The rail assembly includes a rail actuator assembly. The rail actuator assembly includes an actuator and a receiver attached to the actuator. The receiver includes an opening that receives the post of the carriage such that the post floats within the opening to permit the carriage to move a predetermined amount independent from the receiver. The actuator is configured to displace the receiver such that the receiver contacts the post to slide the carriage with respect to the rail assembly. A dolly transfer arm assembly is pivotally connected to the carriage. The transfer arm assembly includes a dolly end effector and a motor assembly. The dolly end effector is configured to engage the dolly and displace the dolly upon actuation of the actuator. A motor assembly is connected to the carriage. The motor assembly actuates to rotate the dolly transfer arm assembly about a rotation axis.

In yet another embodiment, a robotic dolly transfer system for transporting a dolly includes a full dolly transfer system for transporting a full dolly and an empty dolly transfer system that transports an empty dolly. The full dolly transfer system includes a first rail assembly a first carriage that is slidably attached to the first rail assembly. The first carriage includes an upper surface, an opposite bottom surface, and a first post that extends outwardly from the bottom surface of the first carriage. A first rail actuator assembly includes a first actuator and a first receiver attached to the first actuator. The first receiver includes a first opening that receives the first post of the first carriage such that the first post floats within the first opening to permit the first carriage to move a predetermined amount independent from the first receiver. The first actuator is configured to displace the first receiver such that the first receiver contacts the first post to slide the first carriage with respect to the first rail assembly. A full dolly transfer arm assembly is connected to the first carriage. The full dolly transfer arm assembly includes a full dolly end effector configured to engage the full dolly and transfer the full dolly upon actuation of the first actuator.

The empty dolly transfer system includes a second rail assembly and a second carriage slidably attached to the second rail assembly. The second carriage includes an upper surface, an opposite bottom surface, and a second post that extends outwardly from the bottom surface of the second carriage. The second rail actuator assembly includes a second actuator and a second receiver attached to the second actuator. The second receiver includes a second opening that receives the second post of the second carriage such that the second post floats within the second opening to permit the second carriage to move a predetermined amount independent from the second receiver. The second actuator is configured to displace the second receiver such that the second receiver contacts the second post to slide the second carriage with respect to the second rail assembly. An empty dolly transfer arm assembly is pivotally connected to the second carriage. The empty dolly transfer arm assembly includes an empty dolly end effector and a motor assembly. The empty dolly end effector is configured to engage the empty dolly and displace the empty dolly upon actuation of the second actuator. The motor assembly is connected to the second carriage. The motor assembly actuates to rotate the empty dolly transfer arm assembly about a rotation axis.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1A schematically depicts an overhead view of a robotic dolly transfer system including a full dolly transfer system in a home position and an empty dolly transfer system in a home position, according to one or more embodiments shown or described herein;

FIG. 8A schematically depicts an operational sequence of the empty dolly transfer system in which an extension arm is shown in the extended position, according to one or more embodiments shown and described herein;

FIG. 8B schematically depicts an operational sequence of the empty dolly transfer system in which the extension arm is shown in the home position, according to one or more embodiments shown and described herein;

FIG. 8C schematically depicts an operational sequence of the empty dolly transfer system in which the second carriage is illustrated as advancing to an intermediate position with respect to the second rail assembly, according to one or more embodiments shown and described herein;

DETAILED DESCRIPTION

Figure 1B:
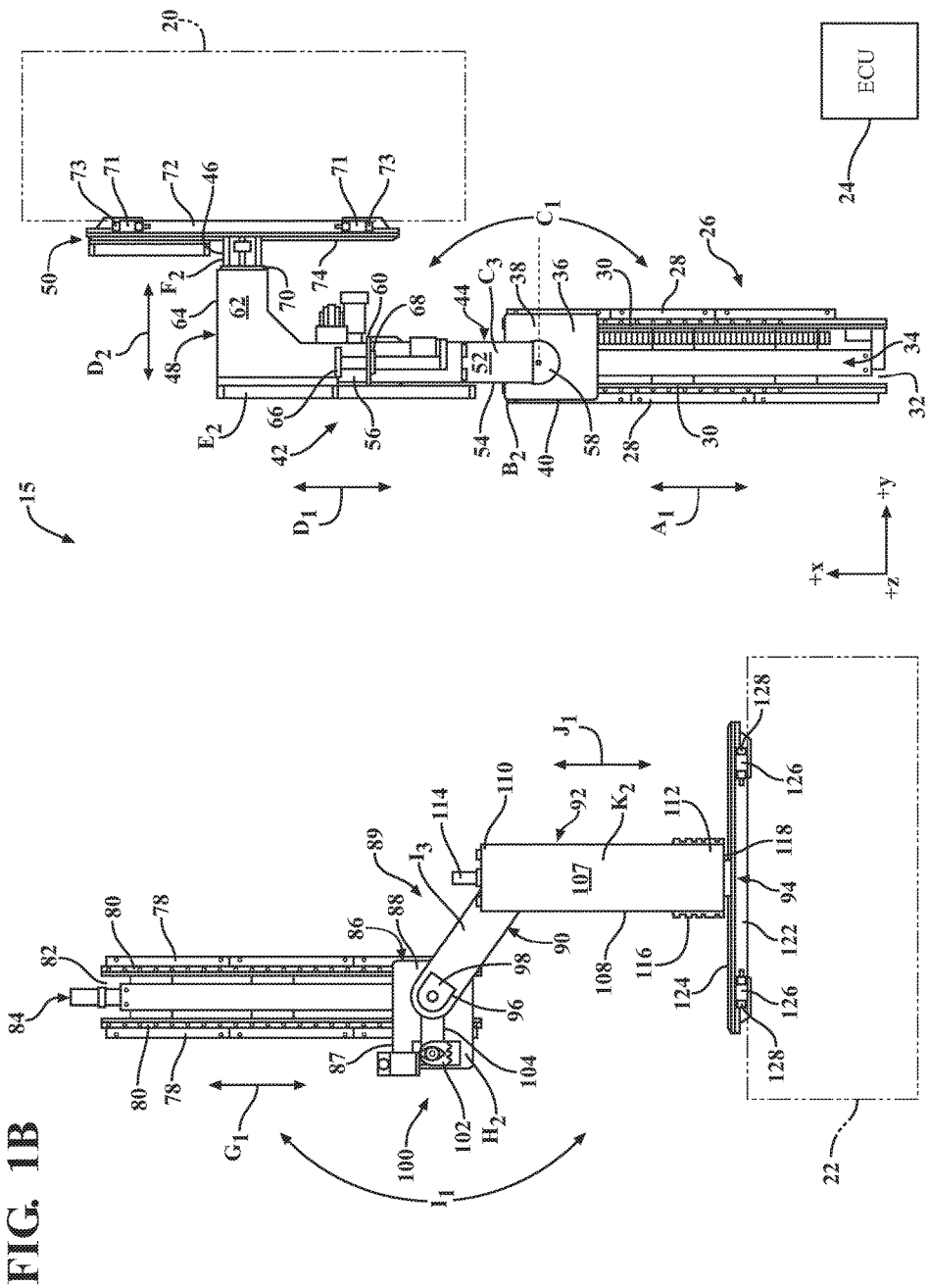
FIG. 1B schematically depicts an overhead view of the robotic dolly transfer system including the full dolly transfer system in an extended position and the empty dolly transfer system in an extended position, according to one or more embodiments shown or described herein.

A robotic dolly transfer system according to the present specification may include a full dolly transfer system and an empty dolly transfer system. The full dolly transfer system and an empty dolly transfer system are operably connected to an electronic control unit. The full dolly transfer system is configured to releasably couple to a full dolly while stationary in a first position and transport the full dolly to a second position, where the full dolly in unloaded. The full dolly transfer system then returns to a home position, waiting on the next full dolly. An empty dolly transfer system is configured to releasably couple to the once full dolly but now an empty dolly. The empty dolly transfer system transports the empty dolly from the second position to a third position, where the empty dolly is decoupled from the empty dolly transfer system and the empty dolly transfer system then returns to a home position to await the next empty dolly.

In order to transport the full dolly along a plurality of axes and positions, the full dolly transfer system may include a first rail assembly. The first rail assembly may include a first pair of sidewalls and a first pair of linear rails mounted onto an upper surface of the pair of sidewalls. The first pair of linear rails are parallel and spaced apart so that the first pair of sidewalls defines a conveyor working surface area there between.

A first carriage of the full dolly transfer system may be slidably attached to the first rail system. The first carriage includes an upper surface and an opposite bottom surface. The upper surface may include a stopper assembly. The bottom surface may include at least a first pair of bearings, such as linear bearings, configured to engage with the first pair of linear rails. A first post may extend from the bottom surface of the first carriage. The first post may have a first outer peripheral surface.

Disposed in the first conveyor working surface area of the full dolly transfer assembly may be a first rail actuator assembly. The first rail actuator assembly may include a first actuator and a first receiver. The first actuator may be a ball screw actuator. The first receiver may have a first plate and a second plate. The second plate may be attached to the first actuator. A first opening is disposed in the first plate. The first opening may have a first inner peripheral surface. The first opening may be configured to receive the first post of the first carriage. The first inner peripheral surface of the first opening has a larger diameter than a diameter of the first outer peripheral of the first post so to allow the first post to float within the first opening of the first receiver a predetermined amount independent from the first receiver.

The float between the first post and the first opening may assist in preventing a mechanical bind between the first rail actuator assembly and the first carriage if a misload occurs. The first actuator is configured to displace the first receiver such that the space between the first inner peripheral of the first opening and the first outer peripheral of the first post becomes smaller until the first outer peripheral of the first post contacts the first inner peripheral of the first opening so to engage with the first post. In turn, the first carriage is slid with respect to the rail assembly between a plurality of positions.

A full dolly transfer arm assembly may be operably connected to the first carriage of the full dolly transfer system. The full dolly transfer arm assembly may include a first arm, a second arm, a connecting arm, and a full dolly end effector. The first arm of the full dolly transfer arm assembly has a top surface and an opposite bottom surface, a working end, and an opposite static end. The static end may be configured to be rotatably coupled to the upper surface of the carriage about a first pivot axis between the stopper assemblies. The top surface of the working end of the first arm of the full dolly transfer arm assembly may have a second pair of linear rails. The second pair of linear rails are parallel and extends longitudinally along the top surface. The second pair of linear rails is laterally spaced apart a predetermined distance and is set at a predetermined height. A first bracket having an aperture may be mounted to the first arm and extends upwardly from the top surface generally adjacent to the working end. A drive wheel assembly may be operably mounted to the bottom surface of the working end of the first arm. The drive wheel assembly may include a drive wheel, a pair of transmission wheels, and a first motor. The first motor is configured to rotate the drive wheel, through the pair of transmission wheels, so to rotate the first arm a predetermined range about the first pivot axis between the stopper assemblies.

The connector arm includes an upper surface and an opposite lower surface. The upper surface may include a second bracket that extends upwardly from the surface. The lower surface of the connector arm may include a first arm portion end and a second arm portion end. The lower surface of the first arm portion end may have a first set of bearings, such as linear bearings, positioned so to slidably engage the linear rails of the first arm, and the lower surface of the second arm portion end may have a second pair of bearings, such as linear bearing, configured to slidably engage the second arm. The upper surface of the first arm may be slidably connected to the first arm portion end of the connector arm so to slide in a first direction. The second arm may be slidably connected to the second arm portion end of the connector arm so to slide in a second direction. The second direction is generally normal to the first direction. The first arm and the second arm may slide independently of each other.

The second arm may include a second pair of opposing sidewalls and a first front wall so to define a channel. A first lip portion having a first through bore may extend from the first front wall. A third pair of linear rails may be mounted to an upper surface of the second pair of opposing sidewalls. The third pair of linear rails may extend longitudinally from the second arm portion end of the connecting arm. A second actuator assembly may be configured to extend and retract the second arm in the second direction. The second actuator assembly may include a second actuator and a first omni directional wheel caster. The first omni directional wheel caster may be mounted to the bottom surface of the channel. The second actuator assembly may be mounted to the lower surface of the connecting arm near the second arm portion end. The second actuator assembly may be configured to extend and retract the second arm with reference to the second arm end portion of the connecting arm.

The full dolly end effector may be pivotally coupled to the first lip portion of the first front wall of the second arm. The full dolly end effector may have a front face and an opposite rear side. A first pair of actuators having a first pair of clamps may be mounted to the front face of the full dolly end effector. The first pair of clamps may be configured to grip a dolly. A first pair of spaced apart flanges may be mounted to the rear side of the full dolly end effector so to define a first slot. The first pair of spaced apart flanges may each include a bore. The bores of the first pair of spaced apart flanges axially aligned with one another. When seated, the first through bore of the first lip portion and the pair of bores axially align so that an individual fastener may be inserted through the pair of bores and the through bore. The individual fastener configuration may allow for the full body end effector to pivot independently from second arm. The pivoting of the full dolly end effector from the second arm allows for the mechanical connection between the full dolly end effector and the second arm to absorb for any variation in the dolly.

The empty dolly transfer system may include a second rail assembly. The second rail assembly may include a third pair of sidewalls and a fourth pair of linear rails which may be mounted onto an upper surface of the third pair of sidewalls. The fourth pair of linear rails are parallel and may be longitudinally spaced apart a predetermined distance and at a predetermined height so that the pair of sidewalls and the pair of rails define a second conveyor working surface area of the empty dolly transfer system therebetween.

A second carriage of the empty dolly transfer system may be slidably attached to the second rail assembly. The second carriage includes an upper surface and an opposite bottom surface. The upper surface may include at least one stopper assembly. The bottom surface may include a fourth pair of bearings, such as linear bearings, configured to engage with the fourth pair of linear rails such that the second carriage is slidable with respect to the rail assembly. A second post may extend from the bottom surface of the carriage. The second post may have a second outer peripheral surface. Disposed in the second conveyor working surface area may be a second rail actuator assembly. The second rail actuator assembly may include a second actuator and a second receiver. The second receiver may have a third plate and a fourth plate. The fourth plate may be attached to the second actuator. The second actuator may be a ball screw actuator. A second opening is disposed in the third plate of the second receiver. The second opening may have a second inner peripheral surface. The second opening may be configured to receive the second post of the carriage.

The second inner peripheral surface of the second opening has a larger diameter than a diameter of the second outer peripheral of the second post so to allow the second post to float within the second opening of the second receiver a predetermined amount independent from the second receiver. The float between the second post and the second opening may assist in preventing a mechanical bind between the second rail actuator assembly and the second carriage if a misload occurs. The second actuator is configured to displace the second receiver such that the space between the second inner peripheral of the second opening and the second outer peripheral of the second post becomes smaller until the outer peripheral of second first post contacts the inner peripheral of the second opening so to engage with the second post. In turn, the second carriage is slid with respect to the second rail assembly between a plurality of positions.

The empty dolly transfer system may include an empty dolly transfer arm assembly pivotally connected to the second carriage. The empty dolly transfer arm assembly may include a rotating arm, an extension arm and an end effector. The rotating arm may include a carriage end and a spindle. The spindle extends outwardly from the carriage end. A motor assembly may be mounted to the top surface of the carriage. The motor assembly may include a second motor and a belt. The belt engages with the second motor and the spindle so to rotate the rotating arm within a predetermined range about the about a rotation axis between the at least one stopper assembly upon an actuation of the second motor. The rotation arm may further include an extension end. The extension end is opposite the carriage end and has an upper surface and an opposite lower surface. A second omni directional wheel caster may be mounted to the lower surface of the extension end.

The extension arm may slidably connect to the extension end of the rotating arm. The extension arm may have a top surface and an opposite bottom surface, a first end, and a second end. A fifth pair of linear rails may be mounted to the bottom surface of the of the extension arm. The fifth pair of linear rails are parallel and extends longitudinally along a length of the bottom surface. The fifth pair of linear rails may be laterally spaced apart a predetermined distance and may be set at a predetermined height. The fifth pair of linear rails may be configured to slidably engage at least one pair of bearings mounted on the upper surface of the extension end. An extension actuator assembly may be mounted to the bottom surface of the extension arm. The extension actuator assembly may be a ball screw actuator. The extension actuator assembly may be configured to extend and retract the extension arm with respect to the extension end. Further, the extension actuator assembly may permit the extension arm to articulate over the extension end in the retract position, and in some embodiments, to articulate over the rotation arm so to have a compact footprint.

A connector may be mounted to the second end of the extension arm. The connector has a second front wall and an adjacent bottom wall. A third omni directional wheel caster is mounted to the bottom wall. A second lip portion may extend from the second front wall. The second lip portion may have a second through bore.

An empty dolly end effector may be pivotally coupled to the second lip portion of the second front wall of the second arm. The empty dolly end effector may have a front face and an opposite rear side. A second pair of actuators having a second pair of clamps may be mounted to the front face of the empty dolly end effector. The second pair of clamps may be configured to grip an empty dolly. A second pair of spaced apart flanges may be mounted to the rear side of the end effector so to define a slot. The second pair of spaced apart flanges each may include a bore. The bore of the second pair of spaced apart flanges axially align with one each other. The second slot may be configured to receive the second lip portion of the connector. When seated, the second through bore of the second lip portion and the pair of bores axially align so that an individual fastener may be inserted through the pair of bores and the second through bore. The individual fastener configuration may allow for the empty dolly end effector to pivot independently from the connector. The pivoting of the empty dolly end effector may permit the empty dolly end effector to adjust for any variation in the dolly and for the variation to be absorbed by the mechanical connection between the empty dolly end effector and the connector of the extension arm.

As used herein, the term "system longitudinal direction" refers to the forward-rearward direction of the system (i.e., in the +/−X direction depicted in FIG. 1A). The term "system lateral direction" refers to the cross-direction (i.e., in the +/−Y direction depicted in FIG. 1A), and is transverse to the longitudinal direction. The term "system vertical direction" refers to the upward-downward direction of the system (i.e., in the +/−Z-direction depicted in FIG. 1A). As used herein, "upper" or "top" is defined as the positive Z direction of the coordinate axis shown in the drawings. "Lower" or "bottom" is defined as the negative Z direction of the coordinate axis shown in the drawings. Further, the terms "inboard," "inward," "outboard" and "outward" are used to describe the relative positioning of various components of the system and/or their movements.

Referring to FIG. 1A, the terms "outboard" or "outward" as used herein refers to a direction of movement or the relative location of a component in direction 10, with respect to a system centerline 12. The term "inboard" or "inward" as used herein refers to a direction of movement or the relative location of component in direction 14 with respect to the system centerline 12.

Referring initially to FIGS. 1A-1B, an overhead view of a robotic dolly transfer system is schematically depicted at 15. The robotic dolly transfer system 15 includes a full dolly transfer system 16, an empty dolly transfer system 18, a full dolly 20 (FIG. 1B), an empty dolly 22 (FIG. 1B), and an electronic control unit ("ECU") 24. The full dolly transfer system 16 and the empty dolly transfer system 18 are operably connected to the ECU 24.

The full dolly transfer system 16 includes a first rail assembly 26. The first rail assembly 26 includes a first pair of sidewalls 28 and a first pair of linear rails 30 mounted onto an upper surface of the pair of sidewalls 28. Each one of the first pair of linear rails 30 is parallel to one another and is laterally spaced apart a predetermined distance and at a predetermined height so that the pair of sidewalls 28 and the pair of linear rails 30 define a first conveyor working surface area 32 of the full dolly transfer system 16 there between. Disposed in the first conveyor working surface area 32 is a first rail actuator assembly 34.

The full dolly transfer system includes a first carriage 36. As will be described in greater detail below, the first carriage 36 is slidably attached to the first rail assembly 26. The first carriage 36 includes an upper surface 38 and an opposite bottom surface 40. The first rail actuator assembly 34 is configured to drive the first carriage 36 between a plurality of positions in the direction A1. It should be appreciated that FIGS. 1A and 1B illustrate the first carriage 36 in two positions: in a home position B1 in FIG. 1A and in an extended position B2 in FIG. 1B, where the first rail actuator assembly 34 has driven the first carriage 36 in the direction A1. It should be appreciated that the first rail actuator assembly 34 may incrementally stop or drive the first carriage 36 anywhere between the home position B1 and the extended position B2 in the direction A1.

A full dolly transfer arm assembly 42 is operably connected to the first carriage 36. The full dolly transfer arm assembly 42 may include a first arm 44, a second arm 46, a connector arm 48, and a full dolly end effector 50. The first arm 44 of the full dolly transfer arm assembly 42 has a top surface 52 and an opposite bottom surface 54. The first arm 44 of the full dolly transfer arm assembly 42 also has a working end 56 and an opposite static end 58. The static end 58 is configured to be pivotally coupled to the upper surface 38 of the first carriage 36 about a first pivot axis C1. It should be appreciated that FIGS. 1A and 1B illustrate the first arm 44 in two positions: in a home position C2 in FIG. 1A and in a rotated position C3 in FIG. 1B where the first arm 44 has pivoted about the first pivot axis C1. It should be appreciated that the first arm 44 may incrementally stop or travel anywhere between the home position C2 and the rotated position C3 about the first pivot axis C1.

The top surface 52 of the first arm 44 of the full dolly transfer arm assembly 42 may include a first bracket 60. The first bracket 60 extends in a system vertical direction from the top surface 52 generally adjacent to the working end 56 of the first arm 44.

The connector arm 48 includes an upper surface 62 and an opposite lower surface 64. The upper surface 62 may include a second bracket 66 that extends in the system vertical direction the upper surface 62. The lower surface 64 of the connector arm 48 includes a first arm portion end 68 and a second arm portion end 70. As will be discussed in greater detail below, the top surface 52 of the first arm 44 is slidably connected to the first arm portion end 68 of the connector arm 48. It should be appreciated that FIGS. 1A and 1B illustrate the connector arm 48 in two positions: in a home position E1 in FIG. 1A and in an extended position E2 in FIG. 1B where the connector arm 48 has traveled in the direction D1. It should also be appreciated that the connector arm 48 may incrementally stop or travel anywhere between the home position E1 and the extended position E2 in the direction D1.

As will be discussed in greater detail below, the second arm 46 is slidably connected to the second arm portion end 70 of the connector arm 48. It should be appreciated that FIGS. 1A and 1B illustrate the second arm 46 in two positions: in a home position F1 in FIG. 1A and in an extended position F2 in FIG. 1B where the second arm 46 has traveled in the direction D2. It should also be appreciated that the second arm 46 may incrementally stop or travel anywhere between the home position F1 and the extended position F2 in the direction D2. The direction D2 is generally normal to the direction D1. The full dolly end effector 50 is pivotally coupled to the second arm 46. The full dolly end effector 50 has a first front face 72 and an opposite first rear side 74. A first pair of actuators 71, such as a pair of pneumatic cylinders, may be mounted to the first front face 72. The first pair of actuators 71 may include a first pair of clamps 73 configured to grip the full dolly 20 when extended.

The empty dolly transfer system 18 includes a second rail assembly 76. The second rail assembly 76 includes a third pair of sidewalls 78 and a fourth pair of linear rails 80 mounted onto an upper surface of the third pair of sidewalls 78. The fourth pair of linear rails 80 are parallel and are laterally spaced apart a predetermined distance and at a predetermined height so that the third pair of sidewalls 78 define a second conveyor working surface area 82 of the empty dolly transfer system 18 therebetween. Disposed in the second conveyor working surface area 82 of the empty dolly transfer system 18 is a second rail actuator assembly 84.

The empty dolly transfer system 18 includes a second carriage 86. As will be described in further detail below, the second carriage 86 is slidably attached to the second rail assembly 76. The second carriage 86 includes a bottom surface 87 and an opposite upper surface 88. The second rail actuator assembly 84 is configured to drive the second carriage 86 along the fourth pair of linear rails 80 into a plurality of positions in the directions G1. It should be appreciated that FIGS. 1A and 1B illustrate the second carriage 86 in two positions: in a home position H1 in FIG. 1A and in an extended position H2 in FIG. 1B where the second rail actuator assembly 84 has driven the second carriage 86 in the direction G1. It should also be appreciated that the second rail actuator assembly 84 may incrementally stop or drive the second carriage 86 anywhere between the home position H1 and the extended position H2 in the direction G1.

An empty dolly transfer arm assembly 89 is pivotally connected to the second carriage 86. The empty dolly transfer arm assembly 89 includes a rotating arm 90, an extension arm 92, and an empty dolly end effector 94. The rotating arm 90 may include a carriage end 96 and a spindle 98. The spindle 98 extends outwardly from the carriage end 96. A motor assembly 100 may be mounted to the top surface of the second carriage 86. The motor assembly 100 may include a second motor 102, a belt 104, and the spindle 98. The belt 104 engages with the second motor 102 and the spindle 98 so to rotate the rotating arm 90 about the spindle 98 about a rotation axis I1. It should be appreciated that FIGS. 1A and 1B illustrate the rotating arm 90 in two positions: in a home position I2 in FIG. 1A and in a rotated position I3 in FIG. 1B where the motor assembly 100 has rotated the rotating arm 90 about the rotation axis I1. It should also be appreciated that the motor assembly 100 may rotate the rotating arm 90 incrementally anywhere between the home position I2 and the rotated position I3 about the rotation axis I1. The rotating arm 90 may further include an extension end 106. The extension end 106 is opposite the carriage end 96.

As will be discussed in further detail below, the extension arm 92 slidably connects to the extension end 106 of the rotating arm 90. The extension arm 92 has a top surface 107 and an opposite bottom surface 108. The extension arm 92 also has a first end 110 and a second end 112. An extension actuator assembly 114 may be mounted to the bottom surface 108 of the extension arm 92. The extension actuator assembly 114 may be a ball screw actuator. The extension actuator assembly 114 is configured to extend and retract the extension arm 92 with respect to the extension end 106. It should be appreciated that FIGS. 1A and 1B illustrate the extension arm 92 in two positions: in a home position K1 in FIG. 1A and in an extended position K2 in FIG. 1B, where the extension actuator assembly 114 has extended and retracted the extension arm 92 in the direction J1. It should also be appreciated that the extension actuator assembly 114 may incrementally extend or retract the extension arm 92 anywhere between the home position K1 and the extended position K2 in the direction J1. Further, the extension actuator assembly 114 permits the extension arm 92 to articulate over the extension end 106 when the extension arm 92 is retracted into the home position K1, and in some embodiments, to articulate over the rotating arm 90 so to have a compact footprint with respect to the full dolly transfer system 16.

A connector 116 is mounted to the second end 112 of the extension arm 92. The connector 116 may have a second front wall 118. The empty dolly end effector 94 is pivotally coupled to the second front wall 118 of the connector 116. The empty dolly end effector 94 has a second front face 122 and an opposite second rear side 124. A second pair of actuators 126, such as pneumatic cylinders, may be mounted to the second front face 122 of the empty dolly end effector 94. The second pair of actuators 126 may have a second pair of clamps 128 mounted thereon. The second pair of clamps 128 may be configured to grip the empty dolly 22.

The ECU 24 may include a memory component, an input component, a processor and a local interface. In some embodiments, the processor includes processing components operable to receive and execute instructions (such as from the memory component). The memory component may store a logic module. The logic module includes a plurality of different pieces of logic, each of which may be embodied as a computer program, firmware, and/or software/hardware. The logic module is executable by the processor. The logic module may have a plurality of preset programming choices for either the full dolly transfer system or the empty dolly transfer system and/or the combination of both systems with each of the plurality of preset programming choices executed by the processor. It should be appreciated that the logic module may be edited or modified to change any of parameters therein. Moreover, the edits may automatically occur from data transmitted to the process or from an outside influence, such as a human programmer.

Figure 2A:
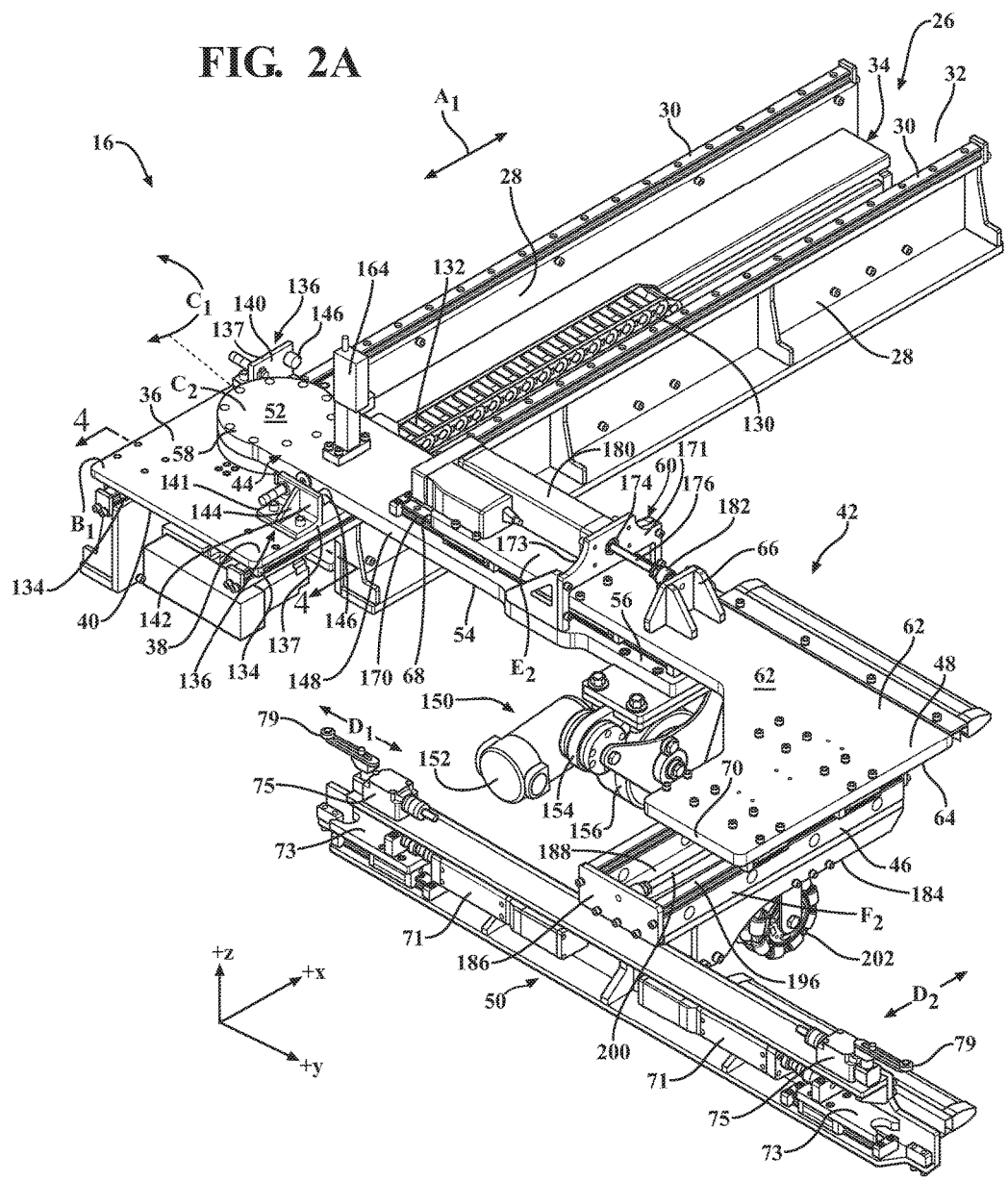
FIG. 2A schematically illustrates an isolated view of the full dolly transfer system in the extended position, according to one or more embodiments shown or described herein.
Figure 2B:
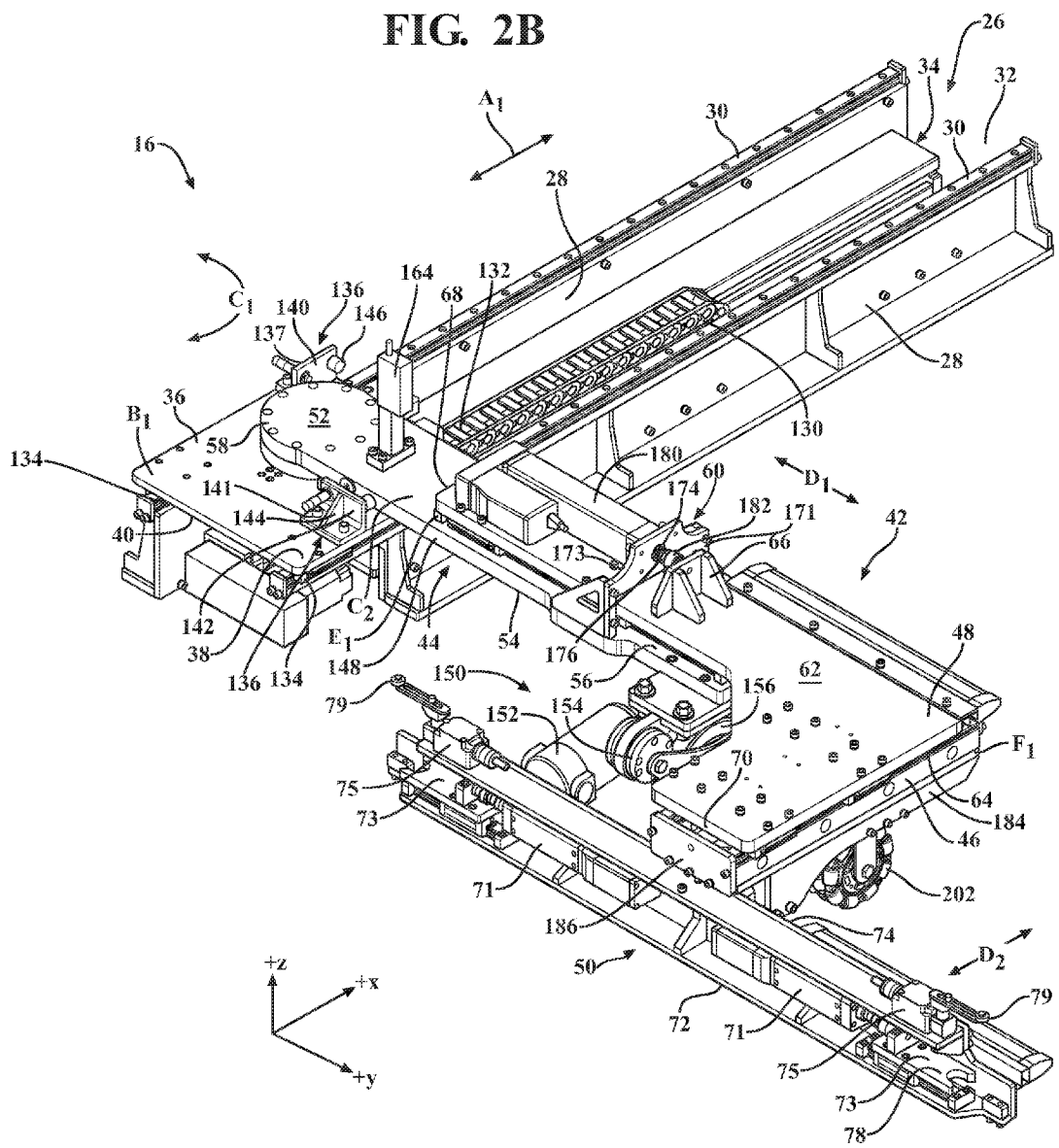
FIG. 2B schematically illustrates an isolated view of the full dolly transfer system in the home position, according to one or more embodiments shown or described herein.
Figure 3:
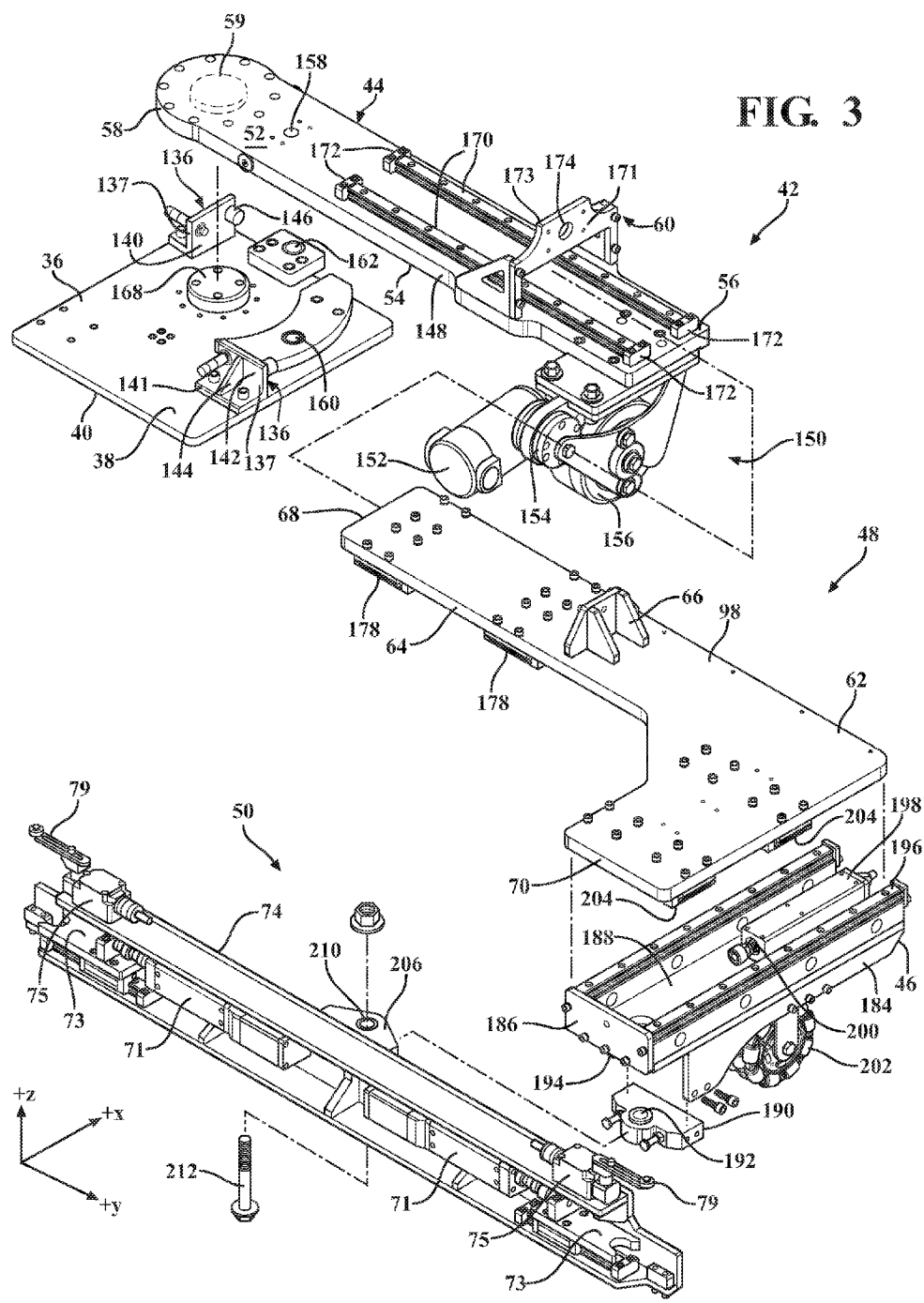
FIG. 3 schematically illustrates an exploded view of the full dolly transfer arm assembly of the full dolly transfer system, according to one or more embodiments shown and described herein.

Now referring to FIGS. 2A-2B and 3, where FIG. 2A is an isolated view of the full dolly transfer system 16 schematically depicting the full dolly transfer system 16 in an extended position, FIG. 2B schematically depicts the full dolly transfer system 16 in a home position, and FIG. 3 schematically depicts an exploded view of the full dolly transfer arm assembly 42. The first rail actuator assembly 34 may further include a flexible elongated member 130 having a channel 132 such as a cat-track or the like, that houses a plurality of communication cables and wiring (not shown) of the full dolly transfer system 16. The flexible elongated member 130 is configured to recoil and extend with the travel of the first carriage 36 in the direction A1 so to prevent damage to the communication cable and the wiring. The communication cable and/or the wiring may be operably connected to a plurality of components, such as to the first carriage 36 and/or the first rail actuator assembly 34 at one end and to the ECU 24 at the other end.

The first carriage 36 may be slidably attached to the first pair of linear rails 30 by a first pair of bearings 134, such as linear bearings. The first pair of bearings 134 are configured to slidably engage the first pair of linear rails 30 so to transport the first carriage 36 along the direction A1. The first pair of bearings 134 are attached to the bottom surface 40 of the first carriage 36 and are spaced apart substantially the same predetermined distance as the first pair of sidewalls 28. Further, it should be appreciated that there may be more than one pair of bearings.

A stopper assembly 136 is mounted to the upper surface 38 of the first carriage 36. The stopper assembly 136 may be adjustable so to set a predetermined range of rotation for the first arm 44 about the first pivot axis C1. It should be appreciated that the stopper assembly 136 may be positioned anywhere on the upper surface 38 of the first carriage 36 so to define the predetermined range anywhere within 360 degrees of rotation. The predetermined range may be adjustable to 90 degrees, 180 degrees and/or 270 degrees. The stopper assembly 136 includes a pair of brackets 137. The pair of brackets 137 includes a front portion 140, a mounting portion 141, and a rear portion 142. A reinforcement rib 144 may extend from the mounting portion 141 upwardly along the rear portion 142. A plunger 146 and/or a stop pad and/or the like may be mounted to the front portion 140. The plunger 146 may be configured to engage with an edge 148 of the first arm 44 so to prevent the first arm 44 from advancing beyond the stopper assembly 136.

A drive wheel assembly 150, such as a friction drive wheel system, is mounted to the bottom surface 54 adjacent to the working end 56 of the first arm 44. The drive wheel assembly 150 may include a first motor 152, a pair of transmission wheels 154, and a drive wheel 156. The first motor 152 is configured to engage the pair of transmission wheels 154. The transmission wheels 154 are configured to engage the drive wheel 156 so to provide a drive force to the drive wheel 156 from the first motor 152. The drive wheel assembly 150 pivots the first arm 44 between the stopper assemblies 136 about the first pivot axis C1. The drive wheel assembly 150 is operated by the ECU 24.

The static end 58 of the first arm 44 has a first bore 158 that corresponds to either a second bore 160 or a third bore 162 in the upper surface 38 of the first carriage 36. A cylinder assembly 164 is mounted to the top surface 52 of the first arm 44 directly above the first bore 158 of the first arm 44. A first elongated member (not shown), such as a pin or a rod, extends from the cylinder assembly 164 through the first bore 158 of the first arm 44 and into either bore 160, 162 of the first carriage 36 depending on whether the first arm 44 is pivoted into the home position C2 or the pivoted position C3. The pin and/or rod may be configured to lock the first arm 44 into a set position with the first carriage 36 so to function as a brake or as a lock mechanism for the drive wheel assembly 150. In other words, when the drive wheel assembly 150 has pivoted the first arm 44 into the stopper assembly 136 either at the home position C2 or pivoted position C3, the cylinder assembly 164 may extend the pin through the first bore 158 of the first arm 44 into the bore 160, 162 of the first carriage 36 so to lock the first arm 44 into that position and prevent any further pivoting until the cylinder assembly 164 retracts the pin.

Referring to FIG. 3, the first carriage 36 includes a generally circular protrusion 168 extending away from the upper surface 38 of the first carriage 36 in the system vertical direction. The bottom surface 54 of the static end 58 of the first arm 44 includes an indentation 59. The indentation 59 is generally circular with a diameter substantially similar to the circular protrusion 168. The indentation 59 is configured to rotatably engage the circular protrusion 168 of the first carriage 36. The indentation 59 is pivoted about the circular protrusion 168 so to define the first pivot axis C1 of the first arm 44 between the stopper assemblies 136 from the home position C2 to the pivoted position C3.

A second pair of linear rails 170 are mounted to the top surface 52 of the first arm 44. The second pair of linear rails 170 is parallel and extend longitudinally along a length of the top surface 52. The second pair of linear rails 170 is laterally spaced apart a predetermined distance and are set at a predetermined height. At an end of the second pair of linear rails 170 is a set of stop plates 172 so to prevent the first arm 44 from extending beyond the stop plates 172.

The first bracket 60 is attached to the top surface 52 of the first arm 44 and extends upwardly in the system vertical direction. The first bracket 60 includes a front surface 171 and a rear surface 173 where the rear surface 173 is closer to the static end 58 of the first arm 44. The first bracket 60 includes an aperture 174 configured to allow a second elongated member 176, such as a rod, to travel through the aperture 174.

The connector arm 48 includes a second pair of bearings 178, such as linear bearings, mounted to the lower surface 64 of the first arm portion end 68 of the connector arm 48. The second pair of bearings 178 are configured to slidably engage with the second pair of linear rails 170. The second pair of bearings 178 are spaced apart substantially the same predetermined distance as the second pair of linear rails 170. Further, it should be appreciated that there may be more than one pair of bearings.

A second actuator 180 may be mounted to the rear surface 173 of the first bracket 60 above the connector arm 48 in a system vertical direction. The second actuator 180 may include the second elongated member 176. The second actuator 180 and the second elongated member 176 may be configured to slidably engage with the second bracket 66 so to apply a force to the second bracket 66. The second actuator 180 and the second elongated member 176 slidably drive the connector arm 48 along the second pair of linear rails 170 in a direction D1. It should be appreciated that FIGS. 2A and 2B illustrate the connector arm 48 in the two positions: in the extended position E2 in FIG. 2A and in the home position E1 in FIG. 2B where the second actuator 180 has extended and retracted the connector arm 48 in the direction D1. It should also be appreciated that the second elongated member 176 may have a tip portion 182, such as a spring assembly, to cushion the impact with the second bracket 66.

The second arm 46 includes a second pair of opposing sidewalls 184 spaced apart a predetermined distance and a first front wall 186 so to define a channel 188. A third pair of linear rails 196 are mounted to an upper surface of the second pair of opposing sidewalls 184. The third pair of linear rails 196 extends the length of the second arm 46. The connector arm 48 may include a third pair of bearings 204, such as linear bearings, mounted to the lower surface 64 of the second arm portion end 70. The third pair of bearings 204 are configured to slidably engage with the third pair of linear rails 196. The third pair of bearings 204 are spaced apart substantially the same predetermined distance as the second pair of opposing sidewalls 184. Further, it should be appreciated that there may be more than one pair of bearings.

The second arm 46 is slidably connected to the second arm portion end 70 of the connector arm 48 so to slide in a direction D2. A third actuator 198 may be mounted to the lower surface of the connector arm 48 near the second arm portion end 70 and positioned within the channel 188. The third actuator 198 may be configured to extend and retract the second arm 46 in the second direction D2. The third actuator 198 may include a third elongated member 200. The third elongated member 200 may be configured to apply a force to the first front wall 186 of the second arm 46 so to slidably drive the second arm 46 in the direction D2. It should be appreciated that FIGS. 2A and 2B illustrate the second arm 46 in the two positions: in the extended position F2 in FIG. 2A and in the home position F1 in FIG. 2B where the third actuator 198 has extended and retracted the second arm 46 in the direction D2. A first omni directional wheel 202 may be mounted to a bottom surface of the channel 188. It should be appreciated that the first omni directional wheel 202 not only allows for linear movement in the D2 direction, but the first omni directional wheel 202 allows for rotational movement first pivotal axis C1 when the first arm 44 is rotated about the first pivot axis C1.

A first lip portion 190 extends from a lower portion 194 of the first front wall 186. The first lip portion includes a first through bore 192. The full dolly end effector 50 is pivotally coupled to the first lip portion 190 of the second arm 46. A first pair of spaced apart flanges 206 are mounted to the rear side 74 of the full dolly end effector 50 so to define a slot. The first pair of spaced apart flanges 206 each includes a pair of fourth bores 210 which axially aligned with the other. The first lip portion 190 of the second arm 46 is received between the first pair of spaced apart flanges 206. When seated, the first through bore 192 of the first lip portion 190 and the fourth pair of bores 210 are axially aligned so that a first fastener 212, such as a pin or a shoulder bolt, may be positioned through the fourth pair of bores 210 and the first through bore 192. The first fastener 212 is the only mechanical connection between the second arm 46 and the full dolly end effector 50 therefore permitting the full dolly end effector 50 to pivot independently from the second arm 46. Accordingly, the mechanical connection between the first lip portion 190 and the first pair of spaced apart flanges 206 allows for the second arm 46 and the full dolly end effector 50 to adjust for any variation in the full dolly 20 to be absorbed by the mechanical connection.

The first pair of clamps 73 may be attached to the first pair of actuators 71. The first pair of clamps 73 may have a generally u-shaped configuration. The u-shaped configuration permits the first pair of clamps 73 to radially surround a side support of the full dolly 20. A first pair of limit switches 75 may be mounted a top surface 77 of the full dolly end effector 50. The first pair of limit switches 75 may have a first pair of rocker arms 79. The full dolly 20 may make contact with the first pair of rocker arms 79. The first pair of limit switches 75 may be configured to transmit an output to the ECU 24 when the first pair of rocker arms 79 is in a predetermined position, and may transmit more than one output based on the first pair of rocker arms 79 position. For example, the output may be configured to transmit when the full dolly 20 is in position to extend and/or retract the first pair of clamps 73 and/or when the first pair of clamps 73 have made contact with the full dolly 20 so that the next instruction in the sequence may occur.

Figure 4A:
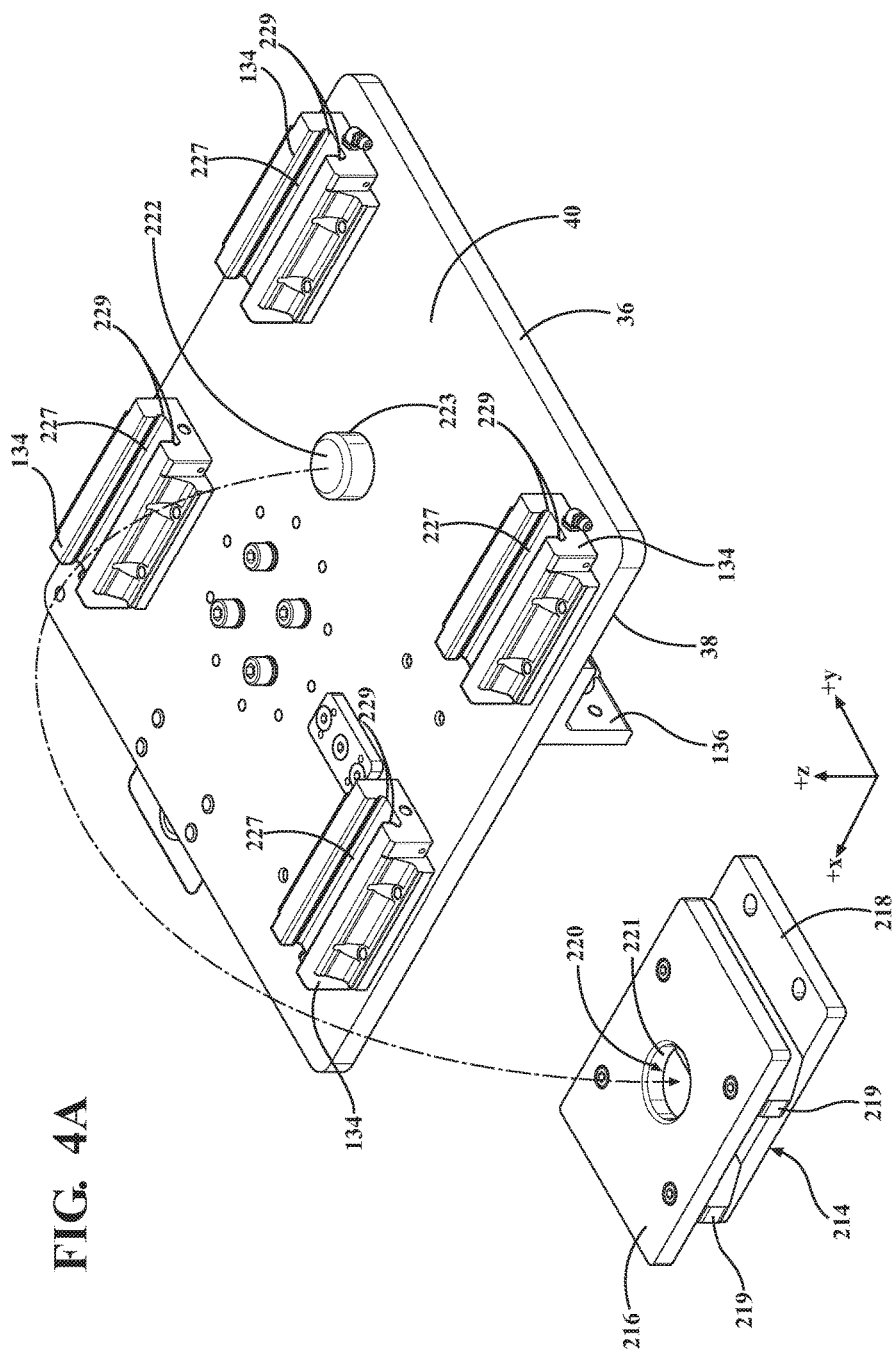
FIG. 4A schematically illustrates an isolated view of a first carriage and a first receiver of the full dolly transfer system, according to one or more embodiments shown and described herein.
Figure 4B:
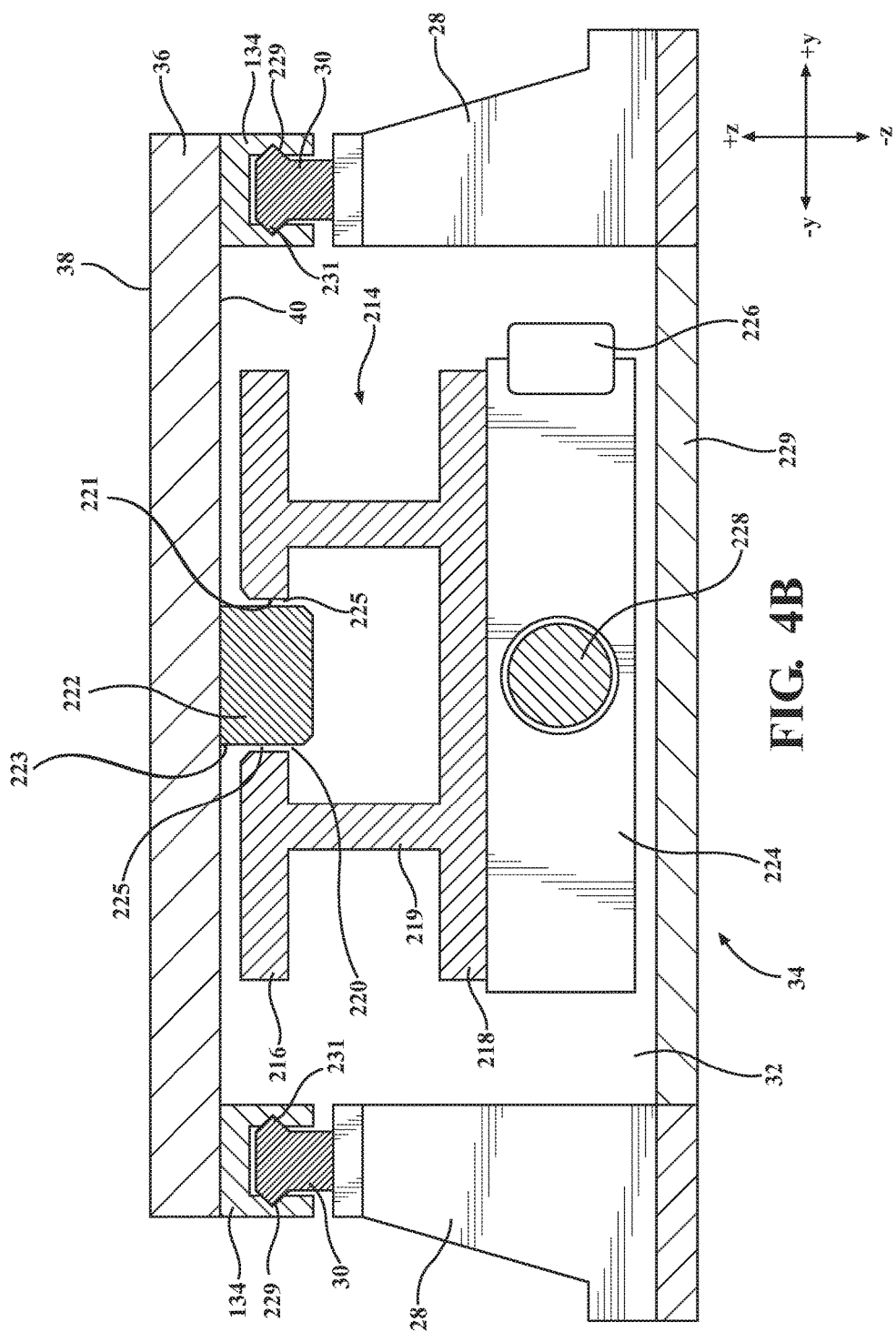
FIG. 4B schematically illustrates an isolated cross-sectional view of the first rail assembly taken along line 4-4 of FIG. 2A, according to one or more embodiments shown and described herein.

With reference to FIGS. 4A-4B, FIG. 4A schematically illustrates an isolated view of a carriage and a first receiving plate adapter and FIG. 4B schematically depicting an isolated cross-sectional view of the rail assembly and specifically the floating coupling, taken from line 4-4. The first carriage 36 in FIG. 4A is inverted so to illustrate the bottom surface 40. The first pair of bearings 134 are mounted to the bottom surface 40 of the first carriage 36. The first pair of bearings 134 are spaced apart substantially the same predetermined distance as the first pair of sidewalls 28. Further, the first pair of bearings 134 includes two pairs of bearings, opposite each other, so to have one pair of bearings on each of the first pair of sidewalls 28. It should be appreciated that more pairs or less pairs of bearings may be used. The first pair of bearings 134 are generally configured with a u-shaped engagement 227 so to slidably engage the first pair of linear rails 30 while locking the first pair of bearings 134 onto the first pair of linear rails 30. The U-shaped engagement 227 has a first pair of notches 229. The first pair of notches 229 extend the length of the U-shaped engagement 227. A first post 222 may project outwardly from the bottom surface 40 of the first carriage 36. The first post 222 may have a first outer peripheral surface 223.

The first receiver 214 has a first plate 216 and a second plate 218. The first plate 216 and second plate 218 may be connected by a first pair of support members 219 extending in the system vertical direction between the first plate 216 and the second plate 218. The first plate 216 and the second plate 218 have an offset configuration, with the first plate 216 having a first opening 220. The second plate 218 has a plurality of through bores.

The first opening 220 may have a first inner peripheral surface 221. The first opening 220 may be configured to receive the first post 222 of the first carriage 36. The first inner peripheral surface 221 of the first opening 220 has a larger diameter than a diameter of the first outer peripheral surface 223 of the first post 222 so to allow the first post 222 to float within the first opening 220 of the first receiver 214 a predetermined amount independent from the first inner peripheral surface 221 of the first opening 220 in the first receiver 214. Specifically, the predetermined amount is the difference between the diameter of the first inner peripheral surface 221 of the first opening 220 and the diameter of the first outer peripheral surface 223 of the first post 222.

In a rest position, a first predetermined gap 225 is formed between the first outer peripheral surface 223 of the first post 222 and the first inner peripheral surface 221 of the first opening 220. In a non-limiting example, the first inner peripheral surface 221 of the first opening 220 may be two millimeters greater than the first outer peripheral surface 223 of the first post 222. In some embodiments, the first predetermined amount allows the first post 222 to travel independently within the first opening 220 in any direction by at least two millimeters. In some other embodiments, the first predetermined amount allows the first post 222 to travel independently within the first opening 220 in the direction A1 by at least two millimeters.

The independent movement of the first post 222 relative to the first opening 220 may assist in preventing a mechanical bind between the first rail actuator assembly 34 and the first carriage 36 if a misload occurs. The first predetermined gap 225 permits the first carriage 36 to independently move, relative to the first receiver 214, the predetermined distance so to that if a misload occurs, instead of binding the first carriage 36 into the first receiver 214 or into the first rail actuator assembly 34, the first predetermined gap 225 permits the first carriage 36 to float thus preventing any mechanical binding.

In some embodiments, the first predetermined gap 225 is equal to the difference between the difference between the first inner peripheral surface 221 of the first opening 220 and the diameter of the first outer peripheral surface 223 of the first post 222.

With reference to FIG. 4B, the first rail actuator assembly 34 includes a first actuator 224. The first actuator 224 may be a ball screw actuator having a third motor 226 and a second threaded rod 228. The second plate 218 may be attached to the first actuator 224 thereby coupling the first carriage 36 to the first actuator 224. The second plate 218 may be attached to the first actuator 224 by the first plurality of fasteners, such as, without limitation, threaded bolts that are positioned in the plurality of through bores formed in the second plate 218. The first actuator 224 is positioned above a floor surface 211 in the system vertical direction so to permit travel of the first actuator 224 along the direction A1.

The first carriage 36 is illustrated in a rest position, in which the first carriage 36 is not moving. The first actuator 224 may be configured to displace the first receiver 214 such that the first actuator 224 moves, independently of the first carriage 36 the first predetermined amount 225. As such, the first inner peripheral surface 221 of the first opening 220 of the first receiver 214 moves prior to contact with the first outer peripheral surface 223 of the first post 222. The first actuator 224 continues to displace the first receiver 214 such that the predetermined gap 225 between the first inner peripheral 221 of the first opening 220 and the first outer peripheral 223 of the first post 222 becomes smaller until the first inner peripheral 221 of the first opening 220 makes contact the first outer peripheral surface 223 of the first post 222 so apply a force to the first post 222 which drives the first carriage 36 in the direction A1. In turn, the first carriage 36 is slid with respect to the first rail assembly 26 between a plurality of positions along the direction A1.

It should be appreciated that when the first actuator 224 stops the displacement of the first receiver 214 in the direction A1, the inner peripheral 221 of the first opening 220 is not forced onto the first outer peripheral 223 of the first post 222, thus permitting the first carriage 36 to independently move within the first predetermined gap 225. Upon loading of the first carriage 36 while the first carriage 36 is still at rest, the carriage is permitted to move independent of the first actuator 224 the distance of the first predetermined amount 225, generally in the direction A1. In some embodiments, the first carriage 36 may move independent of the first actuator 224 in all directions.

As discussed above, the first pair of bearings 134 have two pair on each side of the first carriage 36. The first pair of bearings 134 are slidably attached, in the generally U-shaped engagement 227, to the first pair of linear rails 30. The first pair of linear rails 30 have a first angled protrusion 231 extending outwardly in the system lateral direction on either side of the first pair of linear rails 30 and extend the full length of the linear rail 30 in the system longitudinal direction. The first angled protrusion 231 is configured to engage with the first pair of notches 229 of the first pair of bearings 134 so to lock the first pair of linear bearings 134 onto the first pair of linear rails 30 in the system vertical direction. The first pair of bearings 134 and the first actuator 224 drive the first carriage 36 to travel in the direction A1 along the first pair of linear rails 30.

Figure 5A:
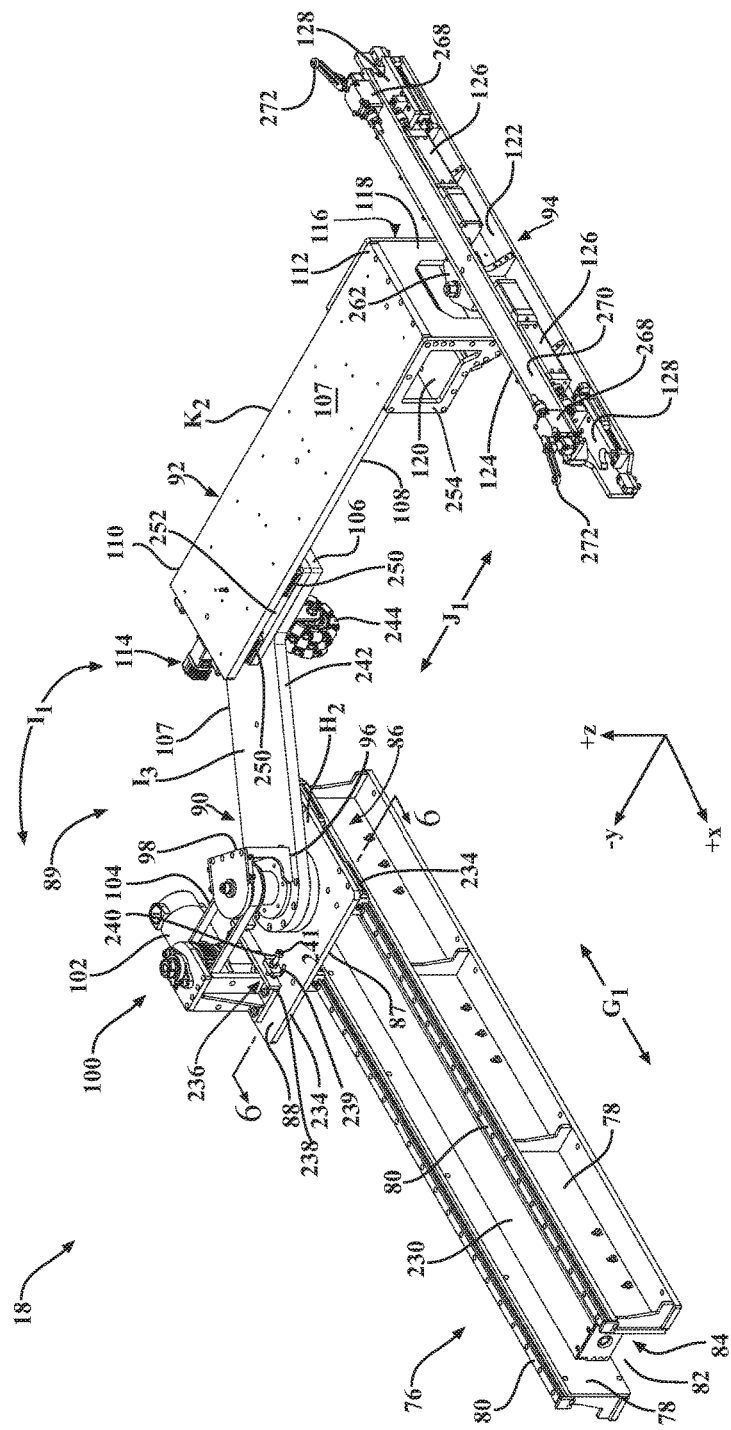
FIG. 5A schematically illustrates an isolated top perspective view of the empty dolly transfer system, according to one or more embodiments shown or described herein.
Figure 5B:
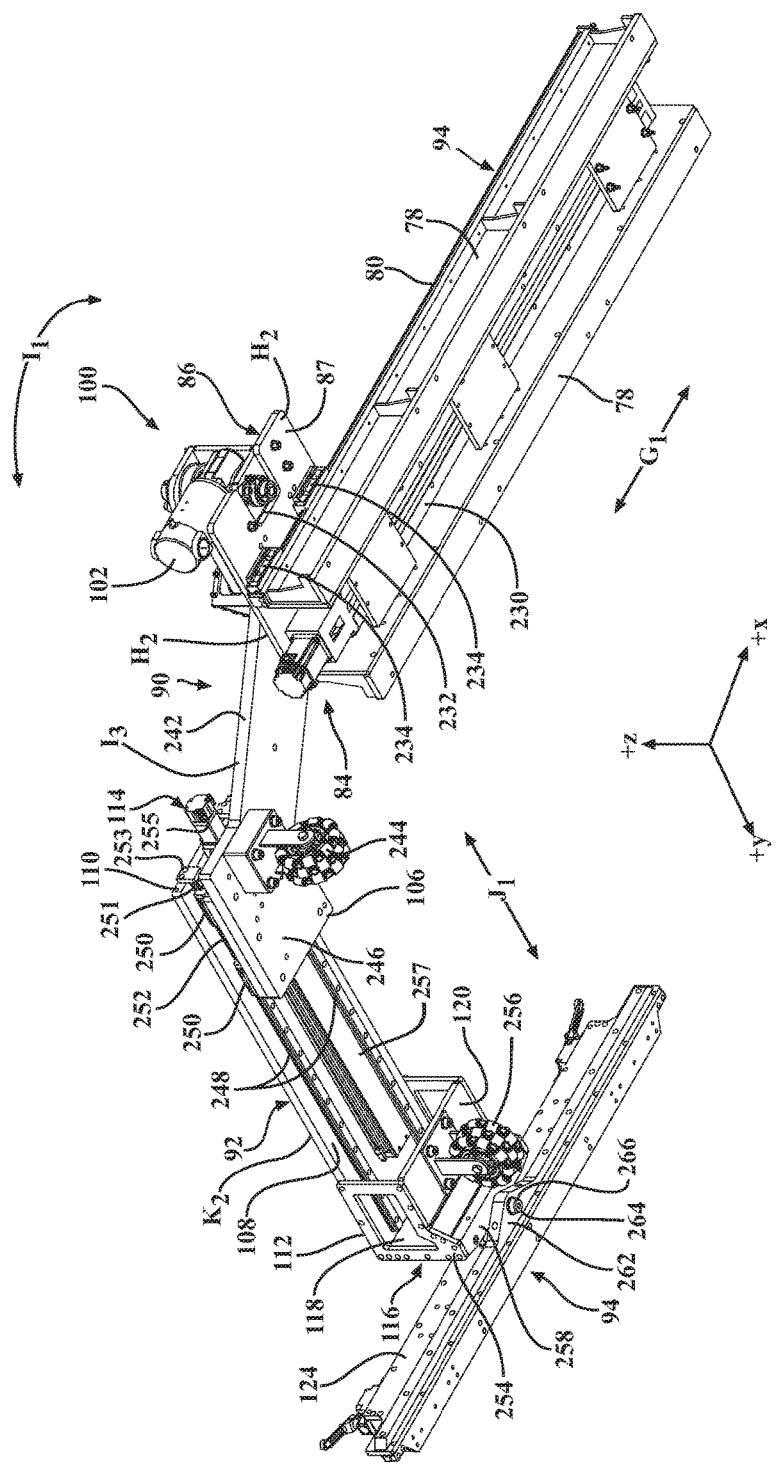
FIG. 5B schematically illustrates an isolated bottom perspective view of the empty dolly transfer system, according to one or more embodiments shown or described herein.

Now referring to FIGS. 5A-5B, an isolated perspective view of the upper and lowers surfaces of the empty dolly transfer system 18 is schematically illustrated. The second rail assembly 76 of the empty dolly transfer system 18 may include the second rail actuator assembly 84 disposed in the second conveyor working surface area 82 of the empty dolly transfer system 18. The second rail actuator assembly 84 extends the length of the second conveyor working surface area 82. The second rail actuator assembly 84 may include a second actuator 230 disposed in the second conveyor working surface area 82. It should be appreciated that the second carriage 86 is illustrated in the extended position H2.

The second carriage 86 may have a generally u-shaped portion 232 opposite the carriage end 96 and the spindle 98 of the rotating arm 90. The generally u-shaped portion 232 may be configured to house a portion of the second motor 102 mounted to the upper surface 88 of the second carriage 86. The second carriage 86 may be slidably attached to the fourth pair of linear rails 80 by at least a fourth pair of bearings 234, such as linear bearings, as will be discussed in further detail below. The second rail actuator assembly 84 may be configured to transport the second carriage 86 along the fourth pair of linear rails 80 in the direction G1 with respect to the second rail assembly 76.

At least one stopper assembly 236 may be mounted to the upper surface 88 of the second carriage 86 or, in the alternative, to a support 238 which is mounted to the upper surface 88 of the second carriage 86. The at least one stopper assembly 236 is configured to be adjustable so to set a predetermined range of rotation for the rotating arm 90 about the rotation axis I1. It should be appreciated that the at least one stopper assembly 236 may be positioned anywhere on the upper surface 88 of the second carriage 86 so to define the predetermined range of rotation. Typically, the predetermined range of rotation may be adjustable to 90 degrees, 180 degrees and/or 270 degrees. However, it should be appreciated that the predetermined range of rotation may be any degree of rotation. The at least one stopper assembly 236 includes a support 238. The support 238 may extended the length of the motor assembly 100 in the system longitudinal direction so to set the predetermined range of rotation. A plunger 240 may extend from the support 238 generally in the system lateral direction. The plunger 240 may have a tip portion 241. The tip portion 241 may be configured to engage with an edge 242 of the rotating arm 90 so to prevent the rotating arm 90 from advancing beyond the at least one stopper assembly 236. A reinforcement support 239 may be positioned between the support 238 and the tip portion 241 so to provide additional strength to the at least one stopper assembly 236.

The spindle 98 may extend outwardly from the carriage end 96 at generally the same height in the system vertical direction as the second motor 102 so that the belt 104 engages with the second motor 102 and the spindle 98 in a general level plane. A second omni directional wheel caster 244 of the empty dolly transfer system 18 may be mounted to a bottom surface 246 of the extension end 106. The motor assembly 100 is operably connected to the ECU 24. When activated, the second motor 102 rotates the belt 104 which in turn rotates the spindle 98. The second omni directional wheel 244 is in contact with a floor surface so that then the spindle rotates, the second omni directional wheel 244 rotates, which in turn, permits the rotating arm 90 to rotate about the rotation axis I1 between the predetermined range of rotation. Moreover, it should be appreciated that the second omni directional wheel 244 not only allows for rotational movement in the I1 direction but also allows for linear movement such as in the G1 direction when the second carriage 86 is moved in the G1 direction. It should be appreciated that the rotating arm is illustrated in the extended position I3 in FIGS. 5A-5B.

A fifth pair of linear rails 248 may be attached to the bottom surface 108 of the extension arm 92. The fifth pair of linear rails 248 is parallel and extends longitudinally along a length of the bottom surface 108 between the first end 110 and the second end 112 of the extension arm 92. The fifth pair of linear rails 248 are laterally spaced apart a predetermined distance and are set at a predetermined height. The extension arm 92 extends and retracts, with reference to the extension end 106, along the fifth pair of linear rails 248, as will be discussed in more detail below.

A fifth pair of bearings 250, such as linear bearings, are mounted to an upper surface 252 of the extension end 106. The fifth pair of bearings 250 are configured to slidably engage with the fifth pair of linear rails 248. The fifth pair of bearings 250 are spaced apart substantially the same predetermined distance as the fifth pair of linear rails 248. Further, the fifth pair of bearings 250 includes two pairs of bearings, opposite each other so to have one pair of bearings 250 on each linear rail 248. The fifth pair of bearings 250 are generally configured with an opening 251 so to slidably engage the fifth pair of linear rails 248 while locking the fifth pair of bearings 250 onto the fifth pair of linear rails 248. A pair of end plates 253 is positioned at the end of the fifth pair of linear rails 248. The pair of end plates 253 is configured to prevent the extension arm 92 from extending beyond the pair of end plates 253.

The extension actuator assembly 114 may be mounted to the bottom surface 108 of the extension arm 92. The extension actuator assembly 114 may be a ball screw actuator having a fourth motor 255 and a threaded rod (not shown) which may be encased by a cover 257. The extension actuator assembly 114 may extend the length of the extension arm 92. The extension actuator assembly 114 is configured to extend and/or retract the extension arm 92, with respect to the extension end 106, in the direction J1. The extension actuator assembly 114 is configured to drive the extension arm 92, along the fifth pair of linear rails 248 which are slidably engaged with the fifth pair of bearings 250, as discussed above, along the direction J1. Further, because the fifth pair of linear rails 248 extend the length of the extension arm 92, the extension actuator assembly 114 may retract the extension arm 92 so that the first end 110 of the extension arm 92 is positioned adjacent to the second carriage 86, at the position K1 (FIG. 8C). In such a position, the second end 112 of the extension arm 92 is positioned adjacent to the extension end 106 so to permit the extension arm 92 to fully retract over the extension end 106 thus articulating over the rotating arm 90. Therefore, the empty dolly transfer system 18 may have a compact footprint with respect to the full dolly transfer system 16. It should be appreciated that in FIGS. 5A-5B, the extension arm 92 is illustrated in the extended position K2.

The connector 116 may be attached to the second end 112 of the extension arm 92. The connector 116 may have the second front wall 118, a bottom wall 120 adjacent to the second front wall 118, and a pair of end walls 254. A third omni directional wheel caster 256 may be mounted to the bottom wall 120 of the connector 116. The third omni directional wheel caster 256 is configured to rotate when the extension actuator assembly 114 extends and/or retracts the extension arm 92 with respect to the extension end 106. The extension actuator assembly 114 is operably connected to the ECU 24. When activated, the extension actuator assembly 114 extends and/or retracts the extension arm 92, thereby rotating the third omni directional wheel caster 256, which is in contact with a floor surface to assist in the extension and retraction of the extension arm 92. The third omni directional wheel 256 may guide the extension arm 92 in the direction J1. Moreover, it should be appreciated that the third omni directional wheel 256 not only allows for linear movement in the J1 direction but also allows for rotational movement, such as in the I1 direction or other linear movements, such as in the G1 direction.

A second lip portion 258 may extend beyond the second front wall 118. That is, the second lip portion 258 may be positioned so to extend outwardly, beyond the second front wall 118 of the connector 116. The second front wall 118 and the pair of end walls 254 may provide support to the second lip portion 258. The second lip portion 258 has a second through bore 260. The empty dolly end effector 94 is pivotally coupled to second lip portion 258. A second pair of spaced apart flanges 262 are mounted to the rear side 124 of the empty dolly end effector 94 so to define a slot. The second pair of spaced apart flanges 262 each include a fifth pair of bores 266 which axially aligned with the other. The second lip portion 258 is received between the second pair of spaced apart flanges 262. When seated, the second through bore 260 of the second lip portion 258 and the fifth pair of bores 266 axially align so that a second fastener 264, such as a pin or a shoulder bolt, may be positioned through the fifth pair of bores 266 and the second through bore 260. The second fastener 264 is the only mechanical connection between the connector 116 and the empty dolly end effector 94 therefore permitting the empty dolly end effector 94 to pivot independently from the connector 116. Accordingly, the mechanical connection between the second lip portion 258 and the second pair of spaced apart flanges 262 allows for the connector 116 and the empty dolly end effector 94 to adjust for any variation in the empty dolly 22 to be absorbed by the mechanical connection.

The second pair of clamps 128 may be attached to the second pair of actuators 126. The second pair of clamps 128 may have a generally u-shaped configuration. The u-shaped configuration permits the second pair of clamps 128 to radially surround a side support of the empty dolly 22. A second pair of limit switches 268 may be mounted a top surface 270 of the empty dolly end effector. The second pair of limit switches 268 may have a second pair of rocker arms 272. The empty dolly 22 may make contact with the second pair of rocker arms 272. The second pair of limit switches 268 may be configured to transmit an output to the ECU 24 when the second pair of rocker arms 272 is in a predetermined position, and may transmit more than one output based on the second pair of rocker arms 272 position. For example, the output may be configured to transmit when the empty dolly 22 is in position to extend and/or retract the second pair of clamps 128 and/or when the second pair of clamps 128 have made contact with the empty dolly 22 so that the next instruction in the sequence may occur.

Figure 6A:
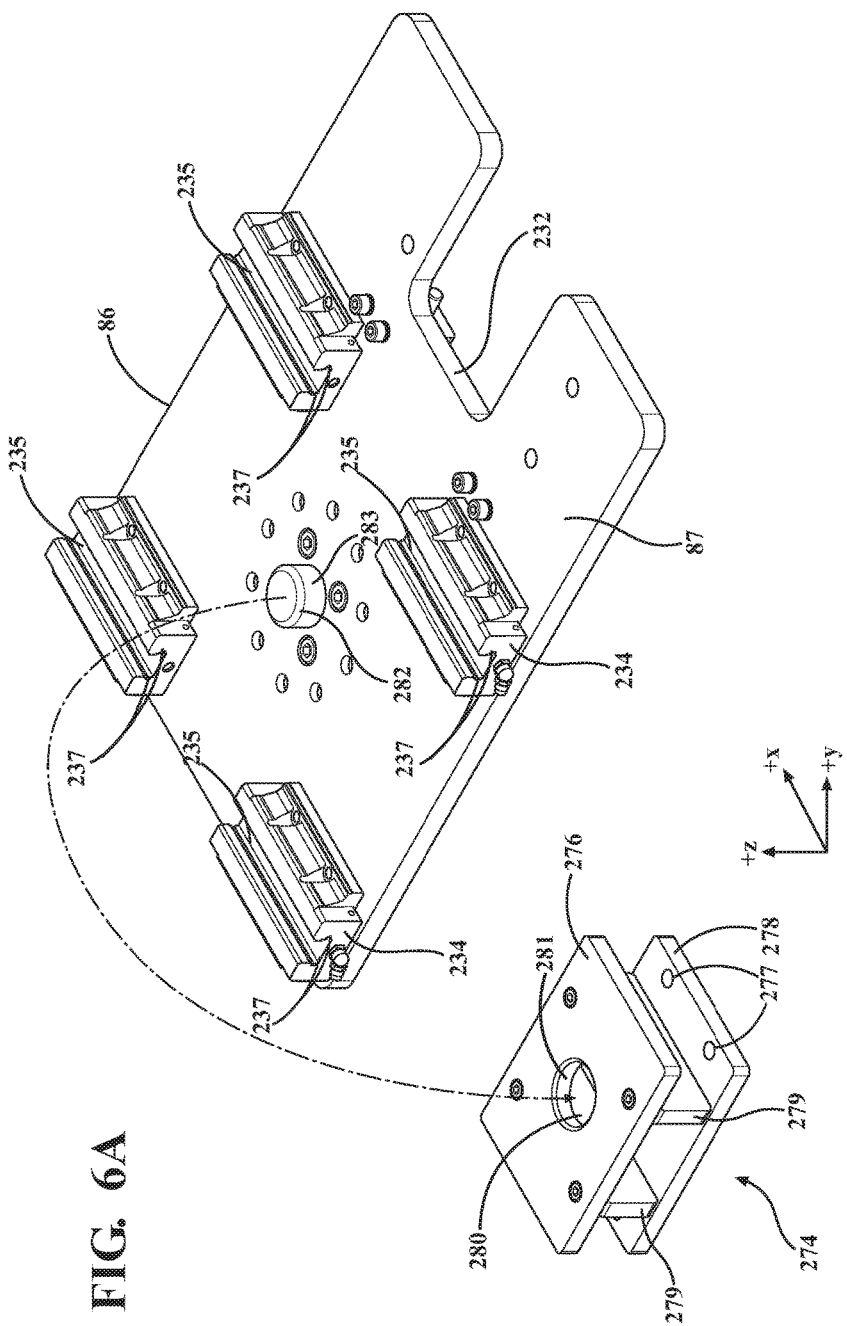
FIG. 6A schematically illustrates an isolated view of a second carriage and a second receiver of FIG. 5A, according to one or more embodiments shown and described herein.
Figure 6B:
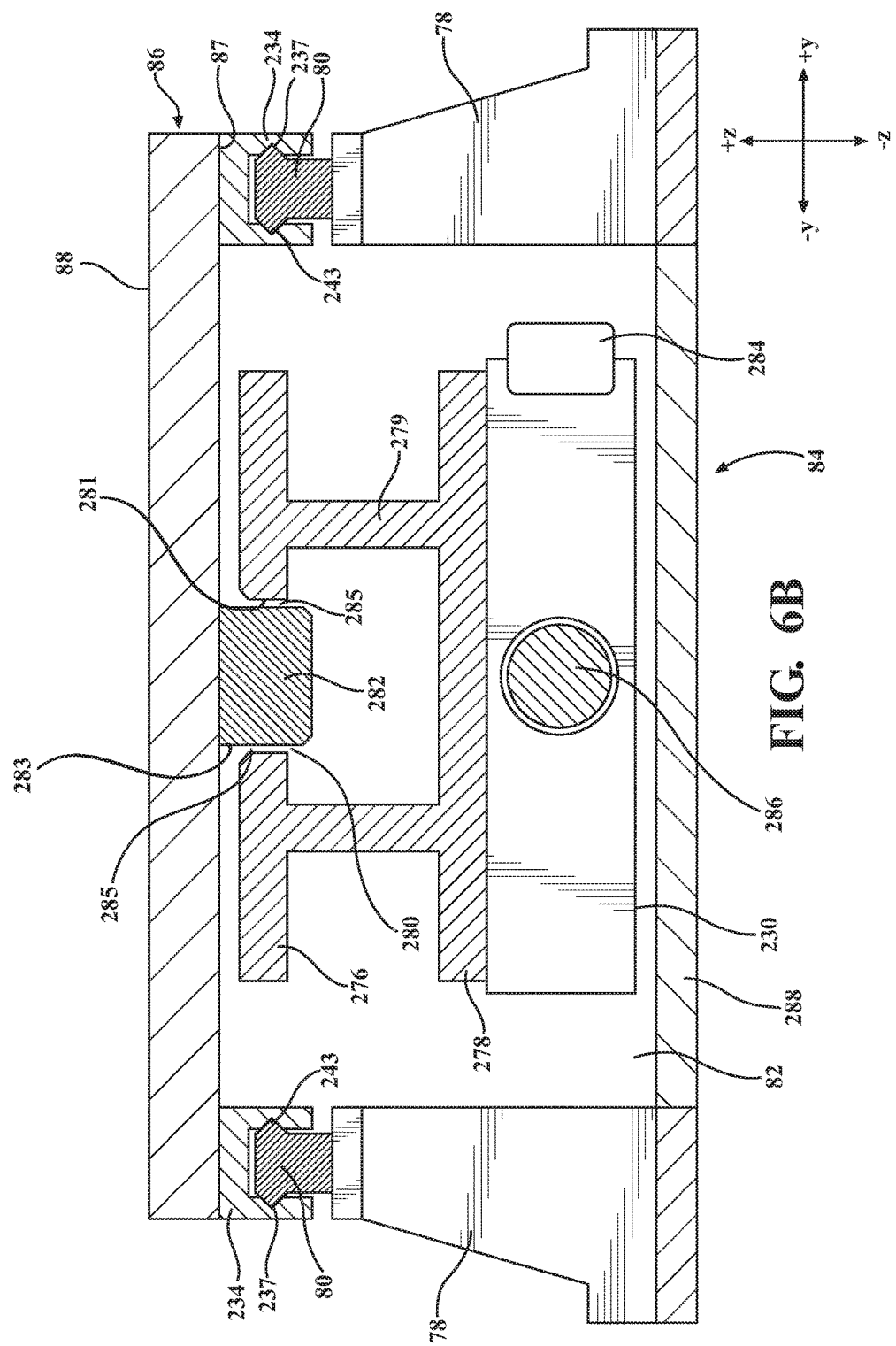
FIG. 6B schematically illustrates an isolated cross-sectional view of the second rail assembly taken along line 6-6 of FIG. 5A, according to one or more embodiments shown and described herein.

With reference to FIGS. 6A-6B, 6A schematically illustrates an isolated view of a carriage and a first receiving plate adapter and FIG. 6B schematically depicting an isolated cross-sectional view of the rail assembly and specifically the floating coupling, taken from line 6-6. The second carriage 86 in FIG. 6A is inverted so to illustrate the bottom surface 87. The u-shaped portion 232 of the second carriage 86 extends inwardly, in the system lateral direction so to permit the clearance needed for a portion of the motor assembly 100 (FIG. 5A-5B). The fourth pair of bearings 234 are mounted to the bottom surface 87 of the second carriage 86. The fourth pair of bearings 234 are spaced apart substantially the same predetermined distance as the third pair of sidewalls 78. Further, the fourth pair of bearings 234 includes two pairs of bearings, opposite each other so to have one pair of bearings 234 on each of the third pair of sidewalls 78. It should be appreciated that more pairs or less pairs of bearings may be used. The fourth pair of bearings 234 are generally configured with a u-shaped engagement 235 so to slidably engage the fourth pair of linear rails 80 while locking the fourth pair of bearings 234 onto the fourth pair of linear rails 80. The u-shaped engagement 235 has a second pair of notches 237. The second pair of notches 237 extend the length of the u-shaped engagement 235. A second post 282 may project outwardly from the bottom surface 87 of the second carriage 86. The second post 282 may have a second outer peripheral surface 283.

The second receiver 274 has a third plate 276 and a fourth plate 278. The third plate 276 and fourth plate 278 may be connected by a second pair of support members 279 extending in the system vertical direction between the third plate 276 and the fourth plate 278. The third plate 276 has a second opening 280. The second opening 280 may have a second inner peripheral surface 281. The second opening 280 may be configured to receive the second post 282 of the second carriage 86. The fourth plate 278 has a second plurality of through bores 277. The second plurality of through bores 277 are configured for a second plurality of fasteners, such as threaded bolts.

The second opening 280 may have a second inner peripheral surface 281. The second opening 280 may be configured to receive the second post 280 of the second carriage 86. The second inner peripheral surface 281 of the second opening 280 has a larger diameter than a diameter of the second outer peripheral surface 283 of the second post 282 so to allow the second post 282 to float within the second opening 280 of the second receiver 274 a predetermined amount from the second inner peripheral surface 281 of the second opening 280 in the second receiver 274. Specifically, the predetermined amount is the difference between the diameter of the second inner peripheral surface 281 of the second opening 280 and the diameter of the second outer peripheral surface 283 of the second post 282.

In a rest position, a second predetermined gap 285 is formed between the second outer peripheral surface 283 of the second post 282 and the second inner peripheral surface 281 of the second opening 280. In a non-limiting example, the second inner peripheral surface 281 of the second opening 280 may be two millimeters greater than the second outer peripheral surface 283 of the second post 282. In some embodiments, the second predetermined amount 285 allows the second post 222 to travel independently within the second opening 280 in any direction by at least two millimeters. In some other embodiments, the second predetermined amount allows the second post 282 to travel independently within the second opening 280 in the direction G1 by at least two millimeters. Therefore, when the second carriage 86 and the second receiver are at rest, i.e. no actuation, the second outer peripheral surface 283 of the second post 282 may not be in contact with the second inner peripheral surface 281 of the second opening 280.

The independent movement of the second post 282 relative to the second opening 280 may assist in preventing a mechanical bind between the second rail assembly 76 and the second carriage 86 if a misload occurs. The second predetermined gap 285 permits the second carriage 86 to independently move within the second predetermined gap 285 so to that if a misload occurs, instead of binding the second carriage 86 into the second receiver 274 or into the second rail assembly 76, the second predetermined gap 285 may permit the second post 282 and thus the second carriage 86 to float therefore preventing any mechanical binding.

In some embodiments, the second predetermined gap 285 is equal to the difference between the difference between the second inner peripheral surface 281 of the second opening 280 and the diameter of the second outer peripheral surface 283 of the second post 282

With reference to FIG. 6B, the first rail actuator assembly 34 includes a second actuator 230. The second actuator 230 may be a ball screw actuator having a fifth motor 284 and a third threaded rod 286. The fourth plate 278 may be attached to the second actuator 230 thereby coupling the second carriage 86 to the second actuator 230. The fourth plate 278 may be attached to the second actuator 230 by the second plurality of fasteners, such as, without limitation, threaded bolts that are positioned in the plurality of through bores 277. The second actuator 230 is positioned above a floor surface 288 in the system vertical direction so to permit travel of the second actuator 230 along the direction G1. The second actuator 230 may be configured to displace the second receiver 274 such that the second outer peripheral surface 283 of the second post 282 contacts the second inner peripheral surface 281 of the second opening 280 to slide the second carriage 86 with respect to the second rail assembly 76.

The second carriage 86 is illustrated in the rest position, in which the second carriage 86 is not moving. The second actuator 230 may be configured to displace the second receiver 274 such that the second actuator 230 moves, independently of the second carriage 86 the predetermined amount. As such, the second inner peripheral surface 281 of the second opening 280 of the second receiver 274 moves prior to contact with the second outer peripheral surface 283 of the second post 282. The second actuator 230 continues to displace the second receiver 274 such that the second predetermined gap 285 between the second inner peripheral 281 of the second opening 280 and the second outer peripheral 283 of the second post 282 becomes smaller until the second inner peripheral 281 of the second opening 280 makes contact the second outer peripheral surface 283 of the second post 282 so apply a force to the second post 282 which drives the second carriage 86 in the direction G1. In turn, the second carriage 86 is slid with respect to the second rail assembly 76 between a plurality of positions along the direction G1.

It should be appreciated that when the second actuator 230 stops the displacement of the second receiver 274 in the direction G1, the second inner peripheral 281 of the second opening 280 is not forced onto the second outer peripheral 283 of the second post 282, thus permitting the second carriage 86 to independently move within the second predetermined gap 285. Upon loading of the second carriage 86 while the second carriage 86 is still at rest, the second carriage 86 is permitted to move independent of the second actuator 230 the distance of the second predetermined amount 285, generally in the direction A1. In some embodiments, the second carriage 86 may move independent of the second actuator 230 in all directions.

As discussed above, the fourth pair of bearings 234 have two pair on each side of the second carriage 86. The fourth pair of bearings 234 are slidably attached to the fourth pair of linear rails 80. The fourth pair of linear rails 80 have a second angled protrusion 243 extending outwardly in the system lateral direction on either side of the fourth pair of linear rails 80 and extending the full length of the fourth pair of linear rails 80 in the system longitudinal direction. The second angled protrusion 243 is configured to engage with the second pair of notches 237 of the fourth pair of bearings 234 so to lock the fourth pair of bearings 234 onto the fourth pair of linear rails 80 in the system vertical direction. The fourth pair of bearings 234 and the second actuator 230 drives the second carriage 86 to travel in the direction G1 along the fourth pair of linear rails 80.

Figure 7A:
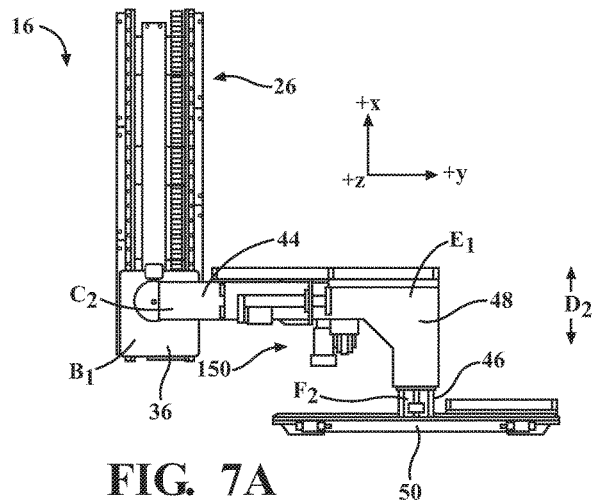
FIG. 7A schematically depicts an operational sequence of the full dolly transfer system in which a second arm is illustrated in the extended position, according to one or more embodiments shown and described herein.
Figure 7B:
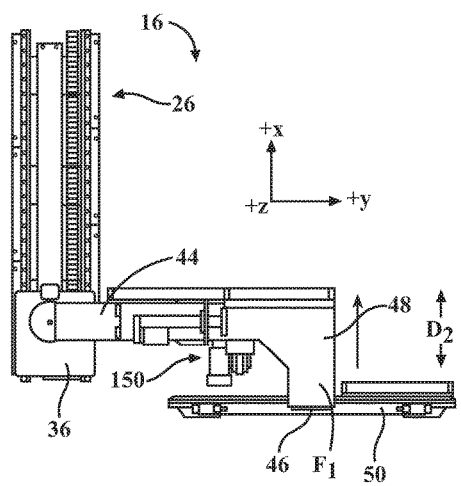
FIG. 7B schematically depicts an operational sequence of the full dolly transfer system in which the second arm is illustrated as retracted into the home position, according to one or more embodiments shown and described herein.
Figure 7C:
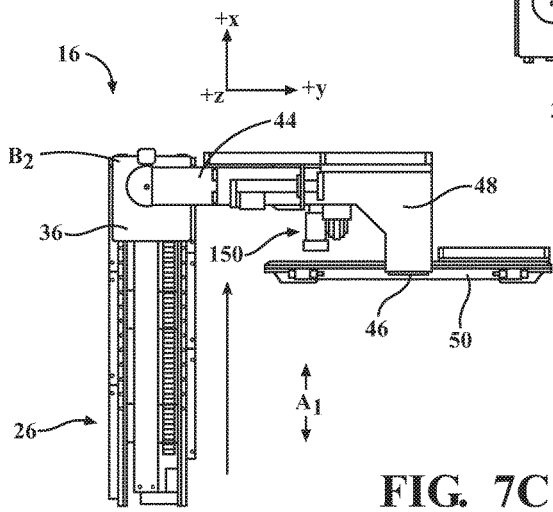
FIG. 7C schematically depicts an operational sequence of the full dolly transfer system in which the first carriage is illustrated as advancing to the extended position, according to one or more embodiments shown and described herein.
Figure 7D:
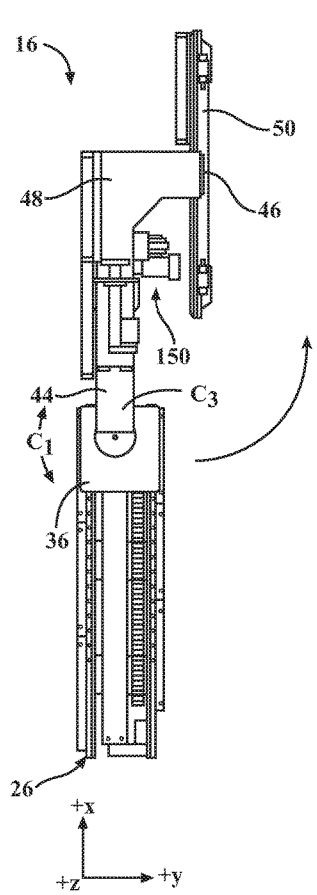
FIG. 7D schematically depicts an operational sequence of the full dolly transfer system in which a first arm is pivoted, according to one or more embodiments shown and described herein.
Figure 7E:
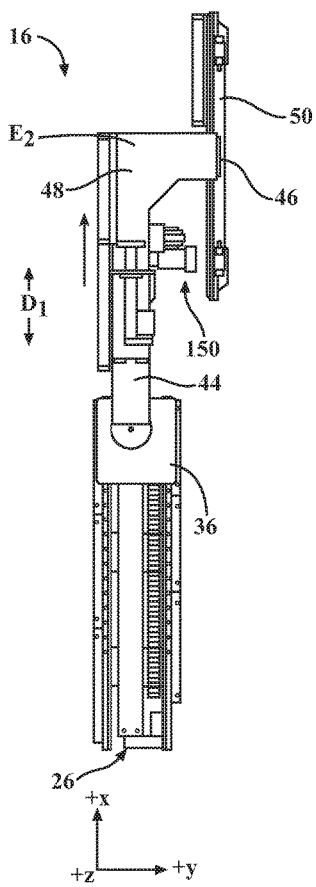
FIG. 7E schematically depicts an operational sequence of the full dolly transfer system in which a connector arm is extended, according to one or more embodiments shown and described herein.
Figure 7F:
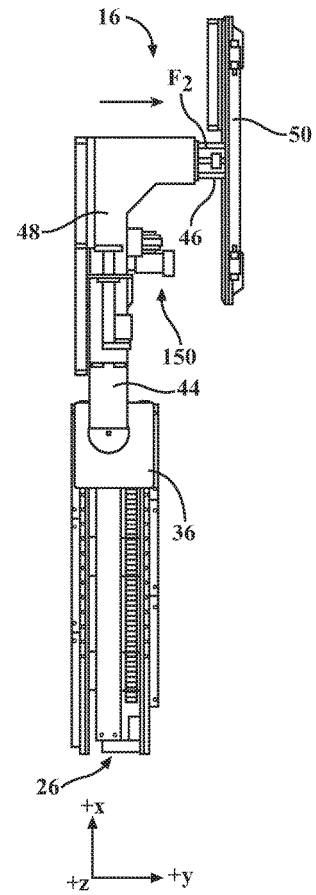
FIG. 7F schematically depicts an operational sequence of the full dolly transfer system in which the second arm is illustrated as being extended, according to one or more embodiments shown and described herein.

With reference to FIGS. 7A-7F, an illustrative example of the sequence of the full dolly transfer system 16 is illustrated. It should be appreciated that the illustrative example is merely an example of one routine of a plurality of programmable positions. Referring to FIG. 7A, the second arm 46 is shown in the extended position F2 in the direction D2. The first carriage 36 is shown in the home position B1, the first arm 44 is shown in the home position C2 and the connector arm 48 is shown in the home position E1. Referring to FIG. 7B, the second arm 46 is illustrated as being retracted to the home position F1 in the direction D2. Referring to FIG. 7C, the first carriage 36 is illustrated as advancing to the extended position B2 with respect to the first rail assembly 26 along the direction A1 Referring to FIG. 7D, the first arm is pivoted by the drive wheel assembly 150 about the first pivot axis C1 to the pivoted position C3. Referring to FIG. 7E, the connector arm 48 is extended along the direction D1 to the extended position E2. Referring to FIG. 7F, the second arm 46 is illustrated as being extended in the direction D2 into the extended position F2.

Figure 8D:
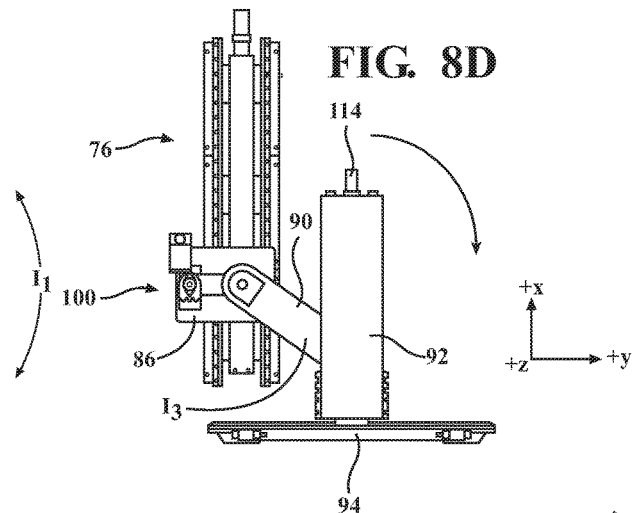
FIG. 8D schematically depicts an operational sequence of the empty dolly transfer system in which a rotating arm is rotated by a motor assembly about a rotation axis to an extended position, according to one or more embodiments shown and described herein.
Figure 8E:
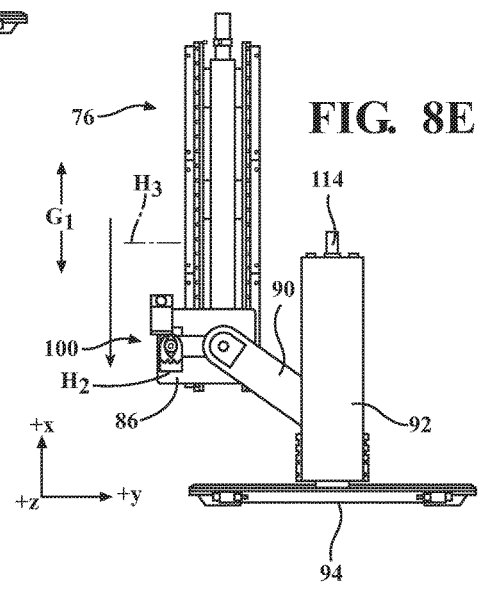
FIG. 8E schematically depicts an operational sequence of the empty dolly transfer system in which the second carriage is illustrated as advancing from the intermediate position to an extended position with respect to the second rail assembly, according to one or more embodiments shown and described herein.
Figure 8F:
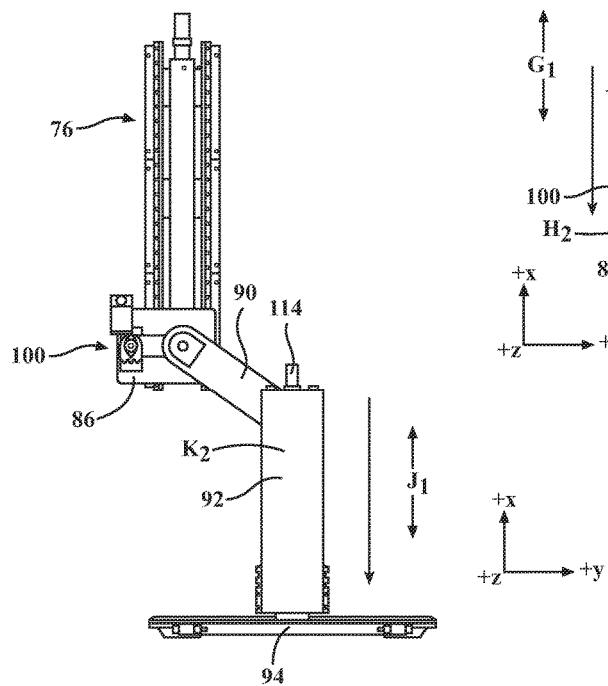
FIG. 8F schematically depicts an operational sequence of the empty dolly transfer system in which the extension arm is shown in the extended position, according to one or more embodiments shown and described herein.

With reference to FIGS. 8A-8F, an illustrative example of the sequence of the empty dolly transfer system 18 is illustrated. It should be appreciated that the illustrative example is merely an example of one routine of a plurality of programmable positions and should not be construed as limiting or claimed subject matter. Referring to FIG. 8A, the extension arm 92 is shown in the extended position K2 in the direction J1. The second carriage 86 is shown in the home position H1 and the rotating arm 90 is shown in the home position I2. Referring to FIG. 8B, the extension arm 92 is shown in the home position K1. Referring to FIG. 8C, the second carriage 86 is illustrated as advancing in the G1 directions to an intermediate position H3 with respect to the second rail assembly 76. Referring to FIG. 8D, the rotating arm 90 is rotated by the motor assembly 100 about the rotation axis I1 to the extended rotation position I3. Referring to FIG. 8E, the second carriage 86 is illustrated as advancing along directions G1 into the extended position H2 with respect to the second rail assembly 76. Referring to FIG. 8F, the extension arm 92 is shown in the extended position K2 in the direction J1.

The robotic dolly transfer system 15, the full dolly transfer system 16 and the empty dolly transfer system 18 are controlled by ECU 24. Specifically the motors and/or actuators are controlled by ECU 24. In particular, the first motor 152, the second motor 102, the third motor 226, the fourth motor 255, the fifth motor 284 and the first actuator 224, the second actuator 180, the third actuator 198, and the actuator assembly 114 are controlled by the ECU 24.

It should be appreciated that the robotic dolly transfer system 15 described herein may only include the full dolly transfer system 16 or the empty dolly transfer system 18 and/or a combination of both systems. Further, it should be appreciated that the rotation, pivot, or slide of each component may happen simultaneously with any other pivot, slide, or rotation even though, for simplistic reasons, the above robotic dolly transfer system has been described with only a single rotation, pivot, or slide occurring at a time. It should also be appreciated that the above-described robotic dolly transfer system may be configured to transport more than just the full dolly 20 and the empty dolly 22. In a non-limiting example, the robotic dolly transfer system 15 may transport a crate, bin, carrier, or the like.

The above-described robotic dolly transfer system may precisely stop and carry large loads dollies while accommodating for a variation in the dolly. Further, the above-described robotic dolly transfer system may have a floating coupling connection between the carriage and the rail actuator so to help assist in preventing mechanical damage and/or still completing the cycle even when a misload occurs during the cycle process.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A full dolly transfer system for transporting a dolly, the system comprising:
   a rail assembly;
   a carriage slidably attached to the rail assembly, the carriage includes an upper surface, an opposite bottom surface, and a post that extends outwardly from the bottom surface of the carriage;
   a rail actuator assembly that includes an actuator and a receiver attached to the actuator, the receiver includes an opening that receives the post of the carriage such that the post floats within the opening to permit the carriage to move a predetermined amount independent from the receiver, the actuator is configured to displace the receiver such that the receiver contacts the post to slide the carriage with respect to the rail assembly; and
a dolly transfer arm assembly connected to the carriage, the dolly transfer arm assembly includes a dolly end effector configured to engage the dolly and transfer the dolly upon actuation of the actuator.

2. The full dolly transfer system of claim 1, wherein the rail assembly includes a pair of linear rails, and wherein the bottom surface of the carriage includes a pair of bearings that engage within the pair of linear rails to slidably connect the carriage to the rail assembly.

3. The full dolly transfer system of claim 2, wherein the actuator is a ball screw actuator.

4. The full dolly transfer system of claim 1, wherein the full dolly transfer arm assembly includes a first arm pivotally connected to the upper surface of the carriage about a first pivot axis,
wherein the upper surface of the carriage includes a stopper assembly that inhibits the full dolly transfer arm from pivoting about the first pivot axis beyond a predetermined range.

5. The full dolly transfer system of claim 4, wherein the full dolly transfer arm assembly includes a second arm and a connector arm, the second arm is pivotally connected to the full dolly end effector and the connector arm connects the second arm to the first arm.

6. The full dolly transfer system of claim 5, wherein the connector arm includes a first arm portion end and a second arm portion end, the first arm is slidably connected to the first arm portion end of the connector arm so as to slide in a first direction,
wherein the second arm is slidably connected to the second arm portion end of the connector arm so as to slide in a second direction generally normal to the first direction.

7. The full dolly transfer system of claim 6 further comprising:
a drive wheel connected to the first arm; and
a motor connected to the drive wheel, the motor actuated to drive the drive wheel to pivot the full dolly transfer arm assembly about the first pivot axis.

8. An empty dolly transfer system for transporting a dolly, the system comprising:
a rail assembly;
a carriage slidably attached to the rail assembly, the carriage includes an upper surface, an opposite bottom surface, and a post that extends outwardly from the bottom surface of the carriage;
a rail actuator assembly that includes an actuator and a receiver attached to the actuator, the receiver includes an opening that receives the post of the carriage such that the post floats within the opening to permit the carriage to move a predetermined amount independent from the receiver, the actuator is configured to displace the receiver such that the receiver contacts the post to slide the carriage with respect to the rail assembly;
a dolly transfer arm assembly pivotally connected to the carriage, the transfer arm assembly includes a dolly end effector configured to engage the dolly and displace the dolly upon actuation of the actuator; and
a motor assembly connected to the carriage, the motor assembly actuates to rotate the dolly transfer arm assembly about a rotation axis.

9. The empty dolly transfer system of claim 8, wherein the rail assembly includes a pair of linear rails, and wherein the bottom surface of the carriage includes a pair of bearings that engage within the pair of linear rails to slidably connect the carriage to the rail assembly.

10. The empty dolly transfer system of claim 9, wherein the actuator is a ball screw actuator.

11. The empty dolly transfer system of claim 8, wherein the empty dolly transfer arm assembly includes a rotating arm rotatably about the rotation axis, the rotating arm includes a carriage end and a spindle extending outwardly from the carriage end,
wherein the motor assembly includes a motor and a belt, the belt engages with the motor and the spindle to rotate the rotating arm upon actuation of the motor.

12. The empty dolly transfer system of claim 11, wherein the rotating arm includes an extension end opposite the carriage end,
wherein the dolly transfer arm assembly includes an extension arm that slidably connects to the extension end of the rotating arm.

13. The empty dolly transfer system of claim 12, wherein the dolly transfer arm assembly includes an extension actuator that is moveable between an extend position and a retracted position, the extension actuator is connected between the rotating arm and the extension arm to linearly displace the extension arm with respect to the extension end of the rotating arm upon movement of the actuator between the extended position and the retracted position.

14. The empty dolly transfer system of claim 13, wherein the extension arm includes a connector that pivotally connects the end effector to the extension arm.

15. A robotic dolly transfer system for transporting a full dolly and an empty dolly, the robotic dolly transfer system comprising:
a full dolly transfer system for transporting a full dolly, the system comprising:
a first rail assembly;
a first carriage slidably attached to the first rail assembly, the first carriage includes an upper surface, an opposite bottom surface, and a first post that extends outwardly from the bottom surface of the first carriage;
a first rail actuator assembly that includes a first actuator and a first receiver attached to the first actuator, the first receiver includes a first opening that receives the first post of the first carriage such that the first post floats within the first opening to permit the first carriage to move a predetermined amount independent from the first receiver, the first actuator is configured to displace the first receiver such that the first receiver contacts the first post to slide the first carriage with respect to the first rail assembly;
a full dolly transfer arm assembly connected to the first carriage the full dolly transfer arm assembly includes a full dolly end effector configured to engage the full dolly and transfer the full dolly upon actuation of the first actuator;
an empty dolly transfer system for transporting the empty dolly, the system comprising:
a second rail assembly;
a second carriage slidably attached to the second rail assembly, the second carriage includes an upper surface, an opposite bottom surface, and a second post that extends outwardly from the bottom surface of the second carriage;

a second rail actuator assembly that includes a second actuator and a second receiver attached to the second actuator, the second receiver includes a second opening that receives the second post of the second carriage such that the second post floats within the second opening to permit the second carriage to move a predetermined amount independent from the second receiver, the second actuator is configured to displace the second receiver such that the second receiver contacts the second post to slide the second carriage with respect to the second rail assembly;

an empty dolly transfer arm assembly pivotally connected to the second carriage, the empty dolly transfer arm assembly includes an empty dolly end effector configured to engage the empty dolly and displace the empty dolly upon actuation of the second actuator; and a motor assembly connected to the second carriage, the motor assembly actuates to rotate the empty dolly transfer arm assembly about a rotation axis.

16. The robotic dolly transfer system of claim 15, wherein the full dolly transfer arm assembly includes a first arm pivotally connected to the upper surface of the first carriage about a first pivot axis, wherein the upper surface of the first carriage includes a stopper assembly that inhibits the full dolly transfer arm from pivoting about the first pivot axis beyond a predetermined range.

17. The robotic dolly transfer system of claim 16 further comprising:

a drive wheel connected to the first arm; and a motor connected to the drive wheel, the motor actuated to drive the drive wheel to pivot the full dolly transfer arm assembly about the first pivot axis.

18. The robotic dolly transfer system of claim 16, wherein the full dolly transfer arm assembly includes a second arm and a connector arm, the second arm is pivotally connected to the full dolly end effector and the connector arm connects the second arm to the first arm.

19. The robotic dolly transfer system of claim 15, wherein the empty dolly transfer arm assembly includes a rotating arm rotatably about the rotation axis, the rotating arm includes a carriage end and a spindle extending outwardly from the carriage end, wherein the motor assembly includes a motor and a belt, the belt engages with the motor and the spindle to rotate the rotating arm upon actuation of the motor.

20. The robotic dolly transfer system of claim 19, wherein the rotating arm includes an extension end opposite the carriage end, wherein the empty dolly transfer arm assembly includes an extension arm that slidably connects to the extension end of the rotating arm, wherein the extension arm includes a connector that pivotally connects the end effector to the extension arm.

* * * * *